US012686645B2

(12) United States Patent
Young et al.

(10) Patent No.: US 12,686,645 B2
(45) Date of Patent: Jul. 21, 2026

(54) GRAPHITE-BASED INFRASTRUCTURES FOR HANDLING MOLTEN METALS AND METHODS OF FORMING THEREOF

(71) Applicant: Fourth Power, Inc, Cambridge, MA (US)

(72) Inventors: Tyler Young, Boston, MA (US); Sandeep Pidaparti, Burlington, MA (US); Mike G. MacGregor, Salem, MA (US); Colin Clancy Kelsall, Cambridge, MA (US); Asegun Henry, Hyde Park, MA (US); Adam King, Cambridge, MA (US)

(73) Assignee: Fourth Power, Inc, Cambridge, MA (US)

( * ) Notice: Subject to any disclaimer, the term of this patent is extended or adjusted under 35 U.S.C. 154(b) by 0 days.

(21) Appl. No.: 19/396,122

(22) Filed: Nov. 20, 2025

(65) Prior Publication Data

US 2026/0132090 A1     May 14, 2026

Related U.S. Application Data

(63) Continuation of application No. PCT/US2025/055514, filed on Nov. 14, 2025.
(Continued)

(51) Int. Cl.
| | |
|---|---|
| *H02S 10/20* | (2014.01) |
| *C04B 37/00* | (2006.01) |
| *H02S 10/30* | (2014.01) |

(52) U.S. Cl.
CPC ............ *C04B 37/003* (2013.01); *H02S 10/20* (2014.12); *H02S 10/30* (2014.12);
(Continued)

(58) Field of Classification Search
CPC .............. C04B 37/00; C04B 2237/083; C04B 2237/363; C04B 2237/60;
(Continued)

(56) References Cited

U.S. PATENT DOCUMENTS

| | | | |
|---|---|---|---|
| 1,083,885 | A | 1/1914 | Lloyd |
| 1,940,983 | A | 12/1933 | Waldron |

(Continued)

FOREIGN PATENT DOCUMENTS

| | | |
|---|---|---|
| CN | 104696266 A | 6/2015 |
| CN | 205790027 U | 12/2016 |

(Continued)

OTHER PUBLICATIONS

"Induction Brazing", Ambrell Induction Heating Solutions, 2025 Ambrell Corporation—https://www.ambrell.com/induction-heating-applications/brazing.
(Continued)

*Primary Examiner* — Quang T Van
(74) *Attorney, Agent, or Firm* — Polygon IP, LLP

(57) ABSTRACT

Described herein are graphite-based infrastructures for high-temperature and/or high-pressure applications and methods of fabricating thereof. Also described are thermal batteries including such infrastructures. An infrastructure may include two graphite structures and a carbide-containing seal positioned between and monolithic with each structure end. The carbide-containing seal may include titanium carbide, zirconium carbide, and/or hafnium carbide. The carbide-containing seal is configured to withstand a temperature of greater than 1500° C. (a) while subjected to an internal pressure of greater than 0.7 MPa (about 100 psi) produced by a molten tin flown through the first structure and the second structure and (b) while remaining monolithic with each of the first-structure sealed end and the second-com-
(Continued)

ponent sealed end, thereby sealing the two structures. The carbide-containing seal may be formed by graphite fusing, which involves one or more of brazing, reaction bonding, and diffusion bonding.

20 Claims, 11 Drawing Sheets

Related U.S. Application Data

(60) Provisional application No. 63/720,312, filed on Nov. 14, 2024.

(52) U.S. Cl.
CPC .. *C04B 2237/083* (2013.01); *C04B 2237/363* (2013.01); *C04B 2237/60* (2013.01); *C04B 2237/708* (2013.01); *C04B 2237/765* (2013.01)

(58) Field of Classification Search
CPC ......... C04B 2237/708; C04B 2237/765; H02S 10/20; H02S 10/30
USPC ....... 219/600, 603, 604, 607, 615, 616, 617, 219/633, 635, 637, 643, 645, 646, 649
See application file for complete search history.

(56) References Cited

U.S. PATENT DOCUMENTS

| | | | |
|---|---|---|---|
| 2,979,813 | A | 4/1961 | Steinberg |
| 3,404,512 | A | 10/1968 | Tomany |
| 4,039,307 | A | 8/1977 | Bondor |
| 4,065,232 | A | 12/1977 | Stratienko |
| 4,074,705 | A | 2/1978 | Robinson, Jr. et al. |
| 4,148,356 | A | 4/1979 | Cramer |
| 4,286,971 | A | 9/1981 | Burcaw, Jr. et al. |
| 4,308,222 | A | 12/1981 | Goettel et al. |
| 4,419,532 | A | 12/1983 | Severns |
| 4,448,448 | A | 5/1984 | Pollia |
| 4,469,493 | A | 9/1984 | Tuovinen et al. |
| 4,478,767 | A | 10/1984 | Watanabe et al. |
| 4,520,761 | A | 6/1985 | Arnold |
| 4,750,943 | A | 6/1988 | Nelson |
| 5,092,362 | A | 3/1992 | Yie |
| 5,160,707 | A | 11/1992 | Murray et al. |
| 5,381,818 | A | 1/1995 | Nendzig et al. |
| 5,398,497 | A | 3/1995 | Suppes |
| 5,593,509 | A | 1/1997 | Zuppero et al. |
| 5,769,067 | A | 6/1998 | Mandeville et al. |
| 5,904,287 | A | 5/1999 | Tashiro et al. |
| 5,967,137 | A | 10/1999 | Guillet et al. |
| 6,421,127 | B1 | 7/2002 | McAndrew et al. |
| 6,833,337 | B2 | 12/2004 | Sandhage et al. |
| 8,044,254 | B2 | 10/2011 | Kanyuh |
| 10,465,995 | B1 | 11/2019 | Henry |
| 11,280,422 | B1 | 3/2022 | Brydon et al. |
| 2002/0102159 | A1 | 8/2002 | Thut |
| 2003/0000640 | A1 | 1/2003 | Mercuri |
| 2003/0230335 | A1 | 12/2003 | Tsukahara |
| 2003/0230336 | A1 | 12/2003 | Malfa et al. |
| 2005/0212297 | A1 | 9/2005 | McPherson |
| 2006/0048808 | A1 | 3/2006 | Ruckman et al. |
| 2007/0144585 | A1 | 6/2007 | Del Castillo Miro |
| 2008/0080988 | A1 | 4/2008 | Wahl et al. |
| 2011/0027673 | A1 | 2/2011 | Ignatiev et al. |
| 2012/0097216 | A1 | 4/2012 | Lin et al. |
| 2013/0004801 | A1 | 1/2013 | Henry |
| 2013/0076027 | A1 | 3/2013 | Maenishi et al. |
| 2013/0334450 | A1 | 12/2013 | Proulx et al. |
| 2013/0337221 | A1 | 12/2013 | Brahmandam et al. |
| 2014/0272639 | A1 | 9/2014 | Zietlow |
| 2014/0369859 | A1 | 12/2014 | Thut |
| 2015/0252807 | A1 | 9/2015 | Cooper |
| 2015/0256119 | A1 | 9/2015 | Datas Medina et al. |
| 2015/0260463 | A1 | 9/2015 | Laughlin et al. |
| 2016/0019757 | A1 | 1/2016 | Knapp et al. |
| 2016/0090812 | A1* | 3/2016 | Zhao ................... E21B 33/1208 264/319 |
| 2016/0118936 | A1 | 4/2016 | Williams |
| 2016/0197574 | A1 | 7/2016 | Henry |
| 2017/0051854 | A1 | 2/2017 | Bird |
| 2017/0197180 | A1 | 7/2017 | Wei |
| 2017/0301413 | A1 | 10/2017 | Cisneros, Jr. et al. |
| 2018/0045197 | A1 | 2/2018 | Henry et al. |
| 2018/0072638 | A1 | 3/2018 | Josch et al. |
| 2018/0097259 | A1 | 4/2018 | Bradwell et al. |
| 2018/0122519 | A1 | 5/2018 | Henry et al. |
| 2018/0149279 | A1 | 5/2018 | Mann, III et al. |
| 2018/0163905 | A1 | 6/2018 | Ohnemus et al. |
| 2018/0224030 | A1 | 8/2018 | Clapper et al. |
| 2019/0085858 | A1 | 3/2019 | Boeglin |
| 2019/0093967 | A1 | 3/2019 | Baxter et al. |
| 2019/0211944 | A1 | 7/2019 | Ismert |
| 2019/0264843 | A1 | 8/2019 | Furcoiu |
| 2020/0212840 | A1 | 7/2020 | Rotschild |
| 2022/0263364 | A1 | 8/2022 | Hopkins et al. |
| 2024/0247657 | A1 | 7/2024 | Hvasta et al. |
| 2024/0247723 | A1 | 7/2024 | Hvasta et al. |
| 2024/0247741 | A1 | 7/2024 | Hvasta et al. |
| 2025/0226784 | A1 | 7/2025 | Kelsall et al. |

FOREIGN PATENT DOCUMENTS

| | | | |
|---|---|---|---|
| CN | 217176890 | | 8/2022 |
| CN | 120907016 | A * | 11/2025 |
| GB | 189820 | A | 12/1922 |
| JP | H08174173 | | 7/1996 |
| WO | 2007134740 | A1 | 11/2007 |
| WO | 2015199775 | A2 | 12/2015 |
| WO | 2017184580 | A1 | 10/2017 |

OTHER PUBLICATIONS

Amy et al. "Ultrahigh temperature sensible heat storage and heat transfer fluids" Chapter 3, pp. 57-84 "Ultra-High Temperature Thermal Energy Storage, Transfer and Conversion Woodhead Publishing Series in Energy" 2021—https://www.sciencedirect.com/science/chapter/edited-volume/abs/pii/B978012819955800003X.

Canonico et al. "Direct Brazing of Ceramics, Graphite, and Refractory Metals" United States: N. p., 1976. Web. doi:10.2172/4051634. https://inis.iaea.org/collection/NCLCollectionStore/_Public/07/254/7254980.pdf.

Lipke et al. "Near net-shape/net-dimension ZrC/W-based composites with complex geometries via rapid prototyping and Displacive Compensation of Porosity"—Journal of the European Ceramic Society 30 (2010) 2265-2277—https://www.sciencedirect.com/science/article/abs/pii/S0955221910000257.

Zhang et al. "Containment materials for liquid tin at 1350° C. as a heat transfer fluid for high temperature concentrated solar power"—Solar Energy 164 (2018) 47-57—https://www.sciencedirect.com/science/article/abs/pii/S0038092X18301063.

International Application Serial No. PCT/US25/55514, Search Report and Written Opinion mailed Mar. 24, 2026.

* cited by examiner

200

210

220

Y

Z

X

200

220

210

260

235

230

250

201

X

Z

Y

400

| Compress sealing structure between first component and second component __410__ |
| --- |
| Use compression fixture __412__ |

| Form secondary seal __420__ |
| --- |

| Forming low-oxygen environment __425__ |
| --- |

| Coat interior surfaces of first component and second component with precursor __450__ |
| --- |

| Form internal carbide-containing sealing coating __455__ |
| --- |

| Heat sealing structure, first-component initial end, and second-component initial end __430__ |
| --- |
| Flow working fluid through first component and second component __432__ |
| Use localized induction heater __434__ |

| Remove compression fixture __440__ |
| --- |

| Flow molten metal __460__ |
| --- |

*FIG. 4*

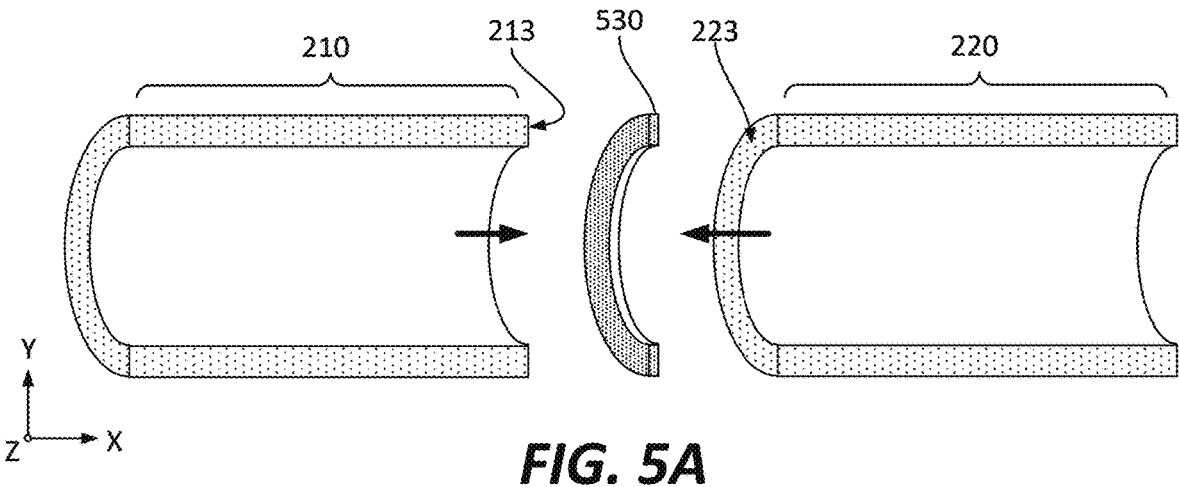
FIG. 5A
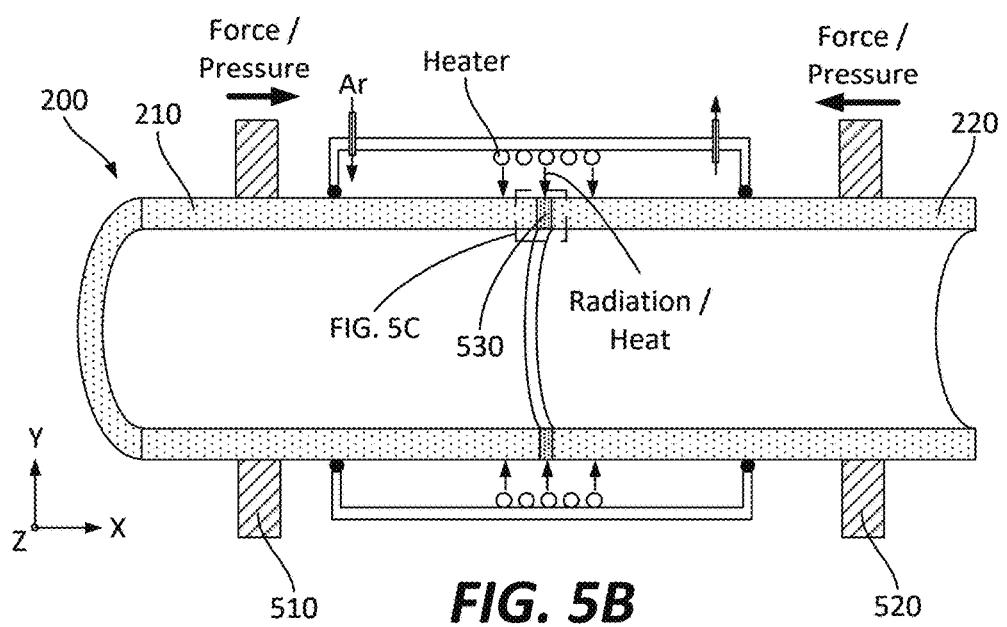
FIG. 5B
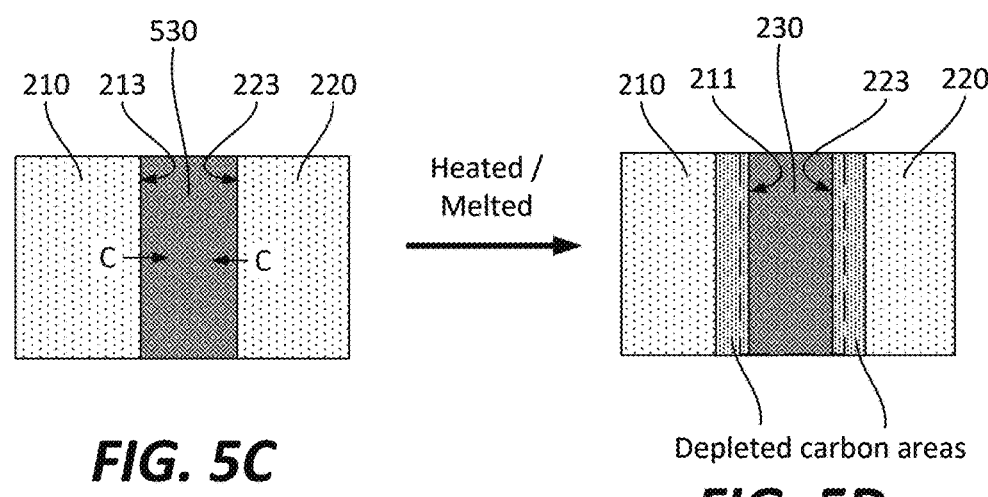
FIG. 5C
FIG. 5D

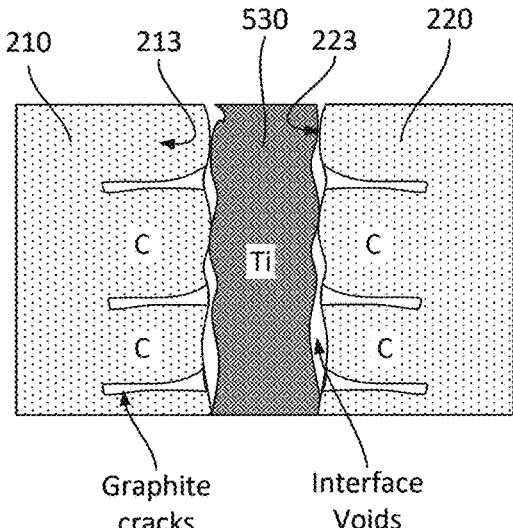
Temperature = T1
(pre-melting)
Graphite cracks
Interface Voids
FIG. 6A
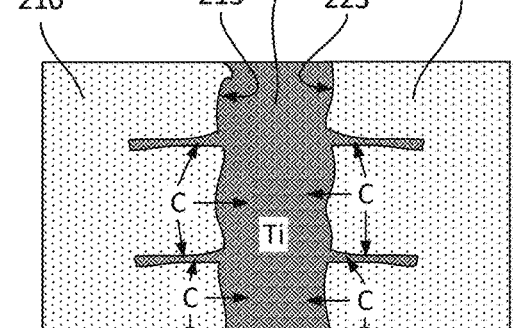
Temperature = T2
(melting)
FIG. 6B
Temperature = T3
(Carbide formation)
Carbon depletion
FIG. 6C AAI M-9435 15.0kV 16.6mm x200 SE(M)                    200um AAI M-9436 15.0kV 16.6mm x500 SE(M)                    100um

GRAPHITE-BASED INFRASTRUCTURES FOR HANDLING MOLTEN METALS AND METHODS OF FORMING THEREOF

CROSS-REFERENCE TO RELATED APPLICATIONS

This application is a continuation of PCT/US25/55514, filed on 2025 Nov. 14, which claims the benefit under 35 U.S.C. § 119(e) of U.S. Provisional Patent Application 63/720,312, filed on 2024 Nov. 14, both of which are incorporated herein by reference in their entirety for all purposes.

BACKGROUND

Thermophotovoltaics (TPV) are a class of heat engines that exploit the photovoltaic effect to convert radiant light from a heated body into electricity. Given sufficient reductions in cost and increases in power conversion efficiency, TPV generators could replace internal combustion or turbine engines in many applications. Similarly, TPV generators could recover industrial waste heat from certain processes to improve efficiency. These same advancements in TPV technology are enabling new applications such as energy storage.

It is often desirable to operate TPV systems, or more specifically, TPV emitters, at very high temperatures, e.g., above 1500° C. or even above 1900° C. The total power radiated per unit area of a TPV emitter ("blackbody" in Stefan-Boltzmann Law) is proportional to the fourth power of the temperature $P \propto T^4$. Thus, higher temperatures lead to significantly higher radiative power. Higher temperatures also shift the peak of the emitted spectrum towards shorter wavelengths (per Wien's Displacement Law). This shift is more suitable for photovoltaic conversion if the bandgap of the TPV cells (on a TPV receiver) is appropriately matched, thereby maximizing absorption and conversion efficiency, which can be as high as 30% or even 55%. Finally, some combustion or industrial processes may generate high-temperature waste heat that can be harnessed using TPV systems, providing a practical application for energy recovery.

The heat energy may be transferred at such temperatures using a molten metal (e.g., molten tin) that is flowed between different components via a thermal battery piping system. However, sealing this piping system can be challenging, as the seal must operate in contact with (and not react to) the molten metal while operating at a wide range of temperatures (e.g., between 0° C. and 3000° C.). Furthermore, graphite components (e.g., pipes, flanges) can be inherently difficult to seal due to the reactive nature of graphite.

SUMMARY

Described herein are graphite-based infrastructures for high-temperature and/or high-pressure applications and methods of fabricating thereof. These graphite-based infrastructures may be referred to as sealed graphite assemblies and graphite piping assemblies. For example, graphite-based infrastructures can be used for handling molten metals at elevated pressures, such as in thermal battery systems, methane pyrolysis systems, and other similar systems/applications. A graphite-based infrastructure may comprise two graphite structures and a carbide-containing seal positioned between and monolithic with each structure end. The carbide-containing seal may comprise titanium carbide ($TiC_x$), zirconium carbide ($ZrC_x$), and/or hafnium carbide ($HfC_x$) with x being 0.5-1 or, more specifically, 0.7-1 in these and all later $MeC_x$ references made in this disclosure. In some examples, the carbide-containing seal may comprise different and/or additional carbides, such as niobium carbide (NbC, $Nb_2C$), tantalum carbide ($TaC_x$), chromium carbide ($Cr_3C_2$), molybdenum carbide (MoC, $Mo_2C$), tungsten carbide ($WC_x$), silicon carbide (SiC), aluminum carbide ($Al_4C_3$), and boron carbide ($B_4C$). The carbide-containing seal is configured to withstand a temperature of greater than 1500° C. (a) while subjected to an internal pressure of greater than 0.7 MPa (about 100 psi) produced by a molten metal flown through the first structure and the second structure and (b) while remaining monolithic with each of the first-component sealed end and the second-component sealed end and sealing the two structures. The carbide-containing seal may be formed by one or more techniques selected from the group consisting of brazing, reaction bonding, and diffusion bonding, which may be collectively referred to as graphite fusing (joining or coupling) using a non-carbon material or carbide-based graphite welding.

Furthermore, these techniques and systems are applicable to other carbon-based materials (besides graphite), as further described below. Finally, unlike pure diffusion bonding or welding of graphite structures, which require significant pressure, graphite fusing involves additional non-carbon materials that chemically react with carbon to form carbides. This novel type of joining or coupling graphite structures does not require high pressures (although pressurization may occur during heating), and it also provides strong and reliable interfaces, e.g., in the form of carbide-containing seals.

Clause 1. A method of forming a graphite-based infrastructure for handling a molten metal that can withstand at least one of a high temperature and a high pressure, the method comprising: positioning a sealing structure between a first graphite component and a second graphite component, wherein: the first graphite component comprises a first-component initial end directly interfacing the sealing structure, the second graphite component comprises a second-component initial end directly interfacing the sealing structure, the sealing structure comprises one or more metals selected from the group consisting of titanium (Ti), zirconium (Zr), hafnium (Hf), silicon (Si), boron (B), and tungsten (W); and heating the sealing structure, the first-component initial end, and the second-component initial end to at least 600° C., thereby (a) forming a carbide-containing seal by converting the sealing structure, the first-component initial end, and the second-component initial end into the carbide-containing seal and (b) forming a first-component sealed end of the first graphite component and a second-component sealed end of the second graphite component.

Clause 2. The method of clause 1, wherein the graphite-based infrastructure, comprising, the carbide-containing seal, is configured to withstand a temperature of greater than 1500° C. (a) while subjected to an internal pressure of greater than 0.7 MPa produced by a molten tin flown through the first graphite component and the second graphite component and (b) while remaining monolithic with each of the first-component sealed end and the second-component sealed end and sealing the first graphite component to the second graphite component.

Clause 3. The method of clause 1, wherein: the carbide-containing seal is positioned between and monolithic with each of the first-component sealed end and the second-component sealed end, thereby sealing the first graphite component and the second graphite component, and the carbide-containing seal comprises one or more carbides selected from the group consisting of titanium carbide, zirconium carbide, and hafnium carbide.

Clause 4. The method of clause 1, wherein the sealing structure, the first-component initial end, and the second-component initial end are heated to at least 2000° C.

Clause 5. The method of clause 1, wherein the sealing structure, the first-component initial end, and the second-component initial end are heated to at least 2500° C.

Clause 6. The method of clause 1, wherein: the one or more metals of the sealing structure have a melting temperature, and the sealing structure, the first-component initial end, and the second-component initial end are heated above the melting temperature of the one or more metals of the sealing structure.

Clause 7. The method of clause 1, wherein heating the sealing structure, the first-component initial end, and the second-component initial end is performed by flowing the molten metal through the first graphite component and the second graphite component.

Clause 8. The method of clause 7, wherein the molten metal comprises tin (Sn).

Clause 9. The method of clause 8, wherein the molten metal further comprises the one or more metals selected from the group consisting of titanium (Ti), zirconium (Zr), and hafnium (Hf).

Clause 10. The method of clause 7, further comprising forming a secondary seal between the first graphite component and the second graphite component before flowing the molten metal through the first graphite component and the second graphite component.

Clause 11. The method of clause 10, wherein the secondary seal is formed by a graphite sheet.

Clause 12. The method of clause 10, wherein the secondary seal blocks the sealing structure from contact with the molten metal.

Clause 13. The method of clause 1, wherein the sealing structure, the first-component initial end, and the second-component initial end are heated, at least within a range of 100° C. to 1500° C. at an average rate of 1000-5000° C./min.

Clause 14. The method of clause 1, wherein the sealing structure, the first-component initial end, and the second-component initial end are positioned in a low-oxygen environment when heated to form the carbide-containing seal.

Clause 15. The method of clause 14, further comprising forming the low-oxygen environment around the sealing structure, the first-component initial end, and the second-component initial end by: sealing an enclosure to the first graphite component and the second graphite component, and flowing an inert gas into the enclosure as well as into the first graphite component and the second graphite component.

Clause 16. The method of clause 1, wherein the sealing structure, the first-component initial end, and the second-component initial end are heated locally using a localized induction heater positioned proximate to the sealing structure, the first-component initial end, and the second-component initial end.

Clause 17. The method of clause 1, wherein the sealing structure is a metal wire forming a ring around openings in the first graphite component and the second graphite component.

Clause 18. The method of clause 1, wherein the sealing structure is a metal foil having a thickness of 25-125 micrometers.

Clause 19. The method of clause 1, wherein the sealing structure has a 3D shape selected from the group consisting of a cylinder, a bottle cap, and a ferrule.

Clause 20. The method of clause 1, wherein the carbide-containing seal is formed by graphite fusing comprising one or more techniques selected from the group consisting of: brazing the sealing structure with each of the first-component initial end and the second-component initial end, reaction bonding the sealing structure with each of the first-component initial end and the second-component initial end, and diffusion bonding the sealing structure with each of the first-component initial end and the second-component initial end.

Clause 21. The method of clause 1, wherein positioning the sealing structure between the first graphite component and the second graphite component is performed using a compression fixture comprising a first clamp, engaging the first graphite component, and a second clamp, engaging the second graphite component.

Clause 22. The method of clause 21, wherein each of the first clamp and the second clamp is formed from a refractory material.

Clause 23. The method of clause 22, wherein the refractory material, forming each of the first clamp and the second clamp, is selected from the group consisting of graphite, tungsten, molybdenum, and carbon-fiber composite.

Clause 24. The method of clause 21, further comprising removing the compression fixture after the carbide-containing seal is formed.

Clause 25. The method of clause 21, wherein the compression fixture remains as a part of the graphite-based infrastructure.

Clause 26. The method of clause 1, wherein positioning the sealing structure between the first graphite component and the second graphite component comprises compressing the sealing structure between the first graphite component and the second graphite component.

Clause 27. The method of clause 26, wherein compressing the sealing structure is compressed between the first graphite component and the second graphite component at a pressure of 70-3,500 kPa.

Clause 28. The method of clause 26, wherein heating the sealing structure, the first-component initial end, and the second-component initial end generates pressure between the sealing structure and each of the first-component initial end and the second-component initial end.

Clause 29. The method of clause 1, wherein heating the sealing structure, the first-component initial end, and the second-component initial end is repeated multiple times to continuously form and repair the carbide-containing seal.

Clause 30. The method of clause 1, further comprising: coating interior surfaces of the first graphite component and the second graphite component with a precursor; forming an internal carbide-containing sealing coating from the precursor.

Clause 31. The method of clause 30, wherein the precursor comprises one or more components selected from the group consisting of a silicon-containing polymer, graphite particles, and metal particles.

Clause 32. The method of clause 30, wherein forming the internal carbide-containing sealing coating comprises heating the precursor.

Clause 33. The method of clause 32, wherein heating the precursor is performed while heating the sealing structure, the first-component initial end, and the second-component initial end to at least 1500° C.

Clause 34. A graphite-based infrastructure comprising: a first graphite component comprising a first-component sealed end 211; a second graphite component comprising a second-component sealed end 221; and a carbide-containing seal positioned between and monolithic with each of the first-component sealed end and the second-component sealed end, thereby sealing the first graphite component to the second graphite component, wherein: each of the first graphite component and the second graphite component comprises graphite, the carbide-containing seal comprises one or more carbides selected from the group consisting of titanium carbide, zirconium carbide, and hafnium carbide, and the carbide-containing seal is configured to withstand a temperature of greater than 1500° C. (a) while subjected to an internal pressure of greater than 0.7 MPa produced by a molten tin flown through the first graphite component and the second graphite component and (b) while remaining monolithic with each of the first-component sealed end and the second-component sealed end and sealing the first graphite component to the second graphite component.

Clause 35. The graphite-based infrastructure of clause 34, wherein the carbide-containing seal is configured to withstand a temperature of greater than 3000° C.

Clause 36. The graphite-based infrastructure of clause 34, wherein: the carbide-containing seal has a thickness, defined by a shortest distance between the first graphite component and the second graphite component, and the thickness of the carbide-containing seal is less than 500 micrometers.

Clause 37. The graphite-based infrastructure of clause 34, wherein: the carbide-containing seal forms an interior opening between the first graphite component and the second graphite component, the interior opening is isolated from environment by the carbide-containing seal, and a cross-sectional area of the interior opening, formed by the carbide-containing seal, is at least 5 cm2.

Clause 38. The graphite-based infrastructure of clause 37, wherein: the carbide-containing seal forms a ring around the cross-sectional area of the interior opening, and the ring formed by the carbide-containing seal has a minimal width (within a cross-sectional plane) of at least 2 millimeters.

Clause 39. The graphite-based infrastructure of clause 34, wherein: each of the first graphite component and the second graphite component has a wall thickness (WT), and the wall thickness (WT) of at least one of the first graphite component and the second graphite component is between 2 millimeters and 200 millimeters.

Clause 40. The graphite-based infrastructure of clause 34, wherein the carbide-containing seal comprises titanium carbide.

Clause 41. The graphite-based infrastructure of clause 34, wherein the carbide-containing seal comprises zirconium carbide.

Clause 42. The graphite-based infrastructure of clause 34, wherein the carbide-containing seal comprises a combination of titanium carbide and zirconium carbide.

Clause 43. The graphite-based infrastructure of clause 42, wherein a molar ratio of titanium carbide to zirconium carbide in the carbide-containing seal is at least 10-90%.

Clause 44. The graphite-based infrastructure of clause 34, wherein an average concentration of the one or more carbides in the carbide-containing seal is at least 50% atomic.

Clause 45. The graphite-based infrastructure of clause 34, wherein the carbide-containing seal further comprises one or more additive elements selected from the group consisting of tantalum (Ta), chromium (Cr), molybdenum (Mo), tungsten (W), manganese (Mn), nickel (Ni), boron (B), silicon (Si), and aluminum (Al).

Clause 46. The graphite-based infrastructure of clause 45, wherein a concentration of the one or more additive elements in the carbide-containing seal is less than 5% atomic.

Clause 47. The graphite-based infrastructure of clause 34, wherein each of the first graphite component and the second graphite component consists substantially of graphite.

Clause 48. The graphite-based infrastructure of clause 34, wherein at least one of the first graphite component and the second graphite component is a part of one or more components is selected from the group consisting of a pump, valve, multi-junction, flow diverter, flow meter, tank, reservoir, elbow, bend, interfacing adapter or any customized geometry for fluid flow.

Clause 49. The graphite-based infrastructure of clause 34, further comprising a packing shell positioned around and enclosing the first-component sealed end, the carbide-containing seal, and the second-component sealed end.

Clause 50. The graphite-based infrastructure of clause 49, the packing shell forces the first-component sealed end and the second-component sealed end toward each other.

Clause 51. The graphite-based infrastructure of clause 34, further comprising a heating element attached to and thermally coupled to one or both of the first graphite component and the second graphite component.

Clause 52. The graphite-based infrastructure of clause 34, further comprising a secondary sealing structure compressed against at least one of the first graphite component and the second graphite component and isolating the carbide-containing seal from environment wherein the secondary sealing structure comprises a flexible graphite sheet.

Clause 53. A thermal battery comprising: a storage unit comprising a set of graphite blocks; a power block comprising a radiation device and a set of thermophotovoltaic receivers configured to convert electromagnetic radiation from the radiation device to electricity; and a piping infrastructure fluidically coupling the storage unit and the power block and comprising a graphite-based infrastructure and molten tin, wherein: the molten tin is enclosed, at least in part, by the graphite-based infrastructure, and the graphite-based infrastructure comprises: a first graphite component comprising a first-component sealed end 211; a second graphite component comprising a second-component sealed end 221; and a carbide-containing seal positioned between and monolithic with each of the first-component sealed end and the second-component sealed end, thereby sealing the first graphite component to the second graphite component, wherein: each of the first graphite component and the second graphite component comprises graphite, the carbide-containing seal comprises one or more carbides selected from the group consisting of titanium carbide, zirconium carbide, and hafnium carbide, and the carbide-containing seal is configured to withstand a temperature of greater than 1500° C. (a) while subjected to an internal pressure of greater than 0.7 MPa produced by a molten tin flown through the first graphite component and the second graphite component and (b) while remaining monolithic with each of the first-component sealed end and the second-component sealed end and sealing the first graphite component to the second graphite component.

BRIEF DESCRIPTION OF THE DRAWINGS

The included drawings are for illustrative purposes and serve only to provide examples of possible structures and operations for the disclosed inventive systems, apparatus, and methods. These drawings in no way limit any changes in form and detail that may be made by one skilled in the art without departing from the spirit and scope of the disclosed implementations.

FIG. 4 is a process flowchart corresponding to a method of forming a carbide-containing seal and, optionally, an internal carbide-containing sealing coating, in accordance with some examples.

FIGS. 5A-5D are schematic views of different stages while forming a carbide-containing seal, in accordance with some examples.

FIGS. 6A-6C are schematic representations of different steps while forming a carbide-containing seal, in accordance with some examples.

DETAILED DESCRIPTION

Introduction

Figure 1:
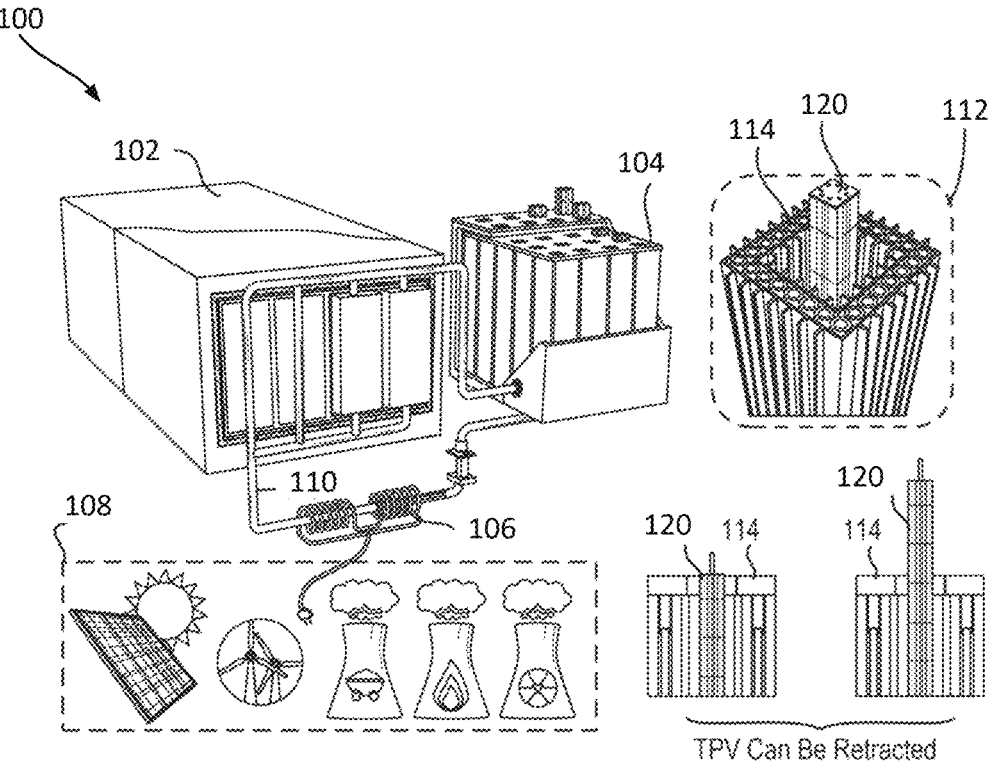
FIG. 1 is a schematic illustration of a thermal battery system comprising a piping infrastructure with one or more graphite-based infrastructures, in accordance with some examples.

As noted above, high temperatures, e.g., above 1500° C. or even above 1900° C., are highly beneficial for the efficient operation of TPV systems. However, forming seals in thermal-battery piping infrastructures, which are formed from graphite components, can be challenging. Described herein are methods of sealing various graphite components (e.g., graphite pipes) using carbide-containing seals. These graphite structures and carbide-containing seals may be a part of a thermal-battery piping infrastructure. Carbide-containing seals may be formed using graphite fusing, which involves one or more processes, including brazing, diffusion bonding, and chemical bonding. As noted above, the carbide-containing seal formed may comprise one or more carbides referenced above. These materials, or more specifically, the metals that form these carbides, are specifically selected due to their corrosion resistance and high operating temperatures of the carbide-containing seal, as further described below.

In some examples, a graphite-based infrastructure may be used for containing (and pumping) molten (e.g., above 1500° C., or even above 1900° C.), methane pyrolysis (e.g., at 1300-1500° C.), and/or other high-temperature applications. Furthermore, a graphite-based infrastructure may be exposed to different environments (e.g., hydrogen, sulfur, oxygen, water, additives associated with plastic pyrolysis, etc.) such that carbide-containing seals remain sufficiently inert to these environments. For example, silicon carbide may be particularly suitable for such applications, e.g., as base materials or in various combinations with one or more of titanium carbide, zirconium carbide, and hafnium carbide.

Definitions

For purposes of this disclosure, the term "pipe" is defined as any structure that allows the passing of a fluid (liquid and/or gas) from one point to another and isolates this fluid from the environment. In other words, a pipe forms an enclosure that is separated from the external environment by the pipe walls. A pipe may include straight pipes, multi-junctions, flow diverters, flow meters, tanks, reservoirs, elbows, bends, interfacing adapters, valves, pumps, and any customized geometry for fluid flow. Furthermore, various cross-sectional shapes are within.

The term "graphite component" refers to a component (e.g., a pipe) comprising essentially graphite, e.g., at least 80% of the structure volume, or even at least 90% of the structure volume.

The term "high temperature" is defined as an assembly that maintains its structural characteristics (e.g., geometry/form) and its functional characteristics (e.g., containing fluid, remaining non-permeable) at a temperature of at least 1500° C. or even at least 1900° C. for a period of time comparable with the operating lifetime of the corresponding component (e.g., at least 1 day, at least 1 month, at least 1 year).

The term "high pressure" is defined as an assembly that maintains its structural characteristics (e.g., geometry/form) and its functional characteristics (e.g., containing fluid, remaining non-permeable) at a pressure greater than 0.7 MPa (about 100 psi) or even greater than 1 MPa (about 150 psi) for a period of time comparable with the operating lifetime of the corresponding component (e.g., at least 1 day, at least 1 month, at least 1 year).

The term "carbide-containing" (as in a carbide-containing seal) is defined as a structure that has a substantial portion formed from carbide, e.g., at least 50% of the structure. For clarity, carbide is a compound of carbon with a more electropositive element, such as a metal. It should be noted that the distribution of carbide in the carbide-based structure may vary (e.g., decrease toward the graphite. Various examples of carbides (described below) are within the scope. These carbides are characterized by high melting points (often >3000° C.), chemical stability, electrical conductivity, and mechanical strength, making them suitable for high-temperature sealing, bonding, or coating applications in graphite-based or other carbon-based systems.

The term "monolithic carbide-containing seal" is defined as a region between two components (e.g., two graphite pipes) that has been permanently joined through the application of heat, pressure, and/or a chemical reaction to create a continuous monolithic bond/structure. In this disclosure, a monolithic carbide-containing seal includes portions formed by graphite fusing (defined as a combination of brazing, diffusion bonding, and/or reaction bonding) wherein the joining material reacts with carbon (of the joined structures) to form a carbide phase (of the joining structure). As such, this type of joining structure may be referred to as a carbide-containing seal. In some examples, such a welded structure provides both mechanical integrity and hermetic sealing at elevated temperatures (e.g., >1500° C.) and pressures (e.g., >0.7 MPa), maintaining a leak-tight connection that remains structurally continuous with the adjoining graphite or carbon-based parts.

It should be noted that at least brazing and diffusion bonding generally apply to metals (rather than materials such as graphite). For example, brazing typically involves melting a filler metal and drawing it into a joint of a base metal by capillary action. The base metal has a higher melting point and therefore does not melt. Diffusion bonding typically involves applying high pressure and temperature to two metal components without requiring any additional filler materials. Reaction bonding involves forming a bond between two materials through chemical reactions. Reaction bonding in the context of joining materials refers to a process where two surfaces are joined together by initiating a chemical reaction between materials forming these surfaces (e.g., carbon and metal forming a carbide). This chemical reaction creates a bond at the interface through the formation of new chemical compounds (e.g., a metal carbide), often achieved by applying heat or pressure to facilitate the reaction between the materials and intermixing.

Furthermore, many reaction bonding processes involve a liquid-phase reactant that is liquid at room temperature and is also applied at room temperature, after which it cures or undergoes a heat treatment step to react in place and form a bond that subsequently solidifies. Essentially, the joint is formed through a chemical reaction rather than just physical contact or melting (e.g., welding, joining, or overlapping of two sets of graphite sheets). Reaction bonding differs from brazing in that brazing involves the melting of an initially solid component (e.g., a metal). The molten material wets the interface between the two parts being joined, after which it reacts to form a new compound (e.g., a carbide) that has a much higher melting point or decomposition point than the melted reactant. Diffusion bonding differs from both brazing and reaction bonding because it does not involve a chemical reaction; instead, it involves the merging of the interface through the diffusion of atoms across the gap and through the interface, effectively unifying the two components as though they were one material. Furthermore, all of these approaches differ from welding, as welding involves melting the component's base material right at the interface, such that the liquid formed fuses, thereby eliminating any gap between them.

Examples of TPV Systems

Various examples of TPV systems are within the scope, such as thermal battery systems, thermal generators, and the like. FIG. 1 is a schematic illustration of a thermal battery system 100 (interchangeably referred to herein as a thermal battery), in accordance with some examples. The thermal battery system 100 may comprise a storage unit 102, formed from a set of graphite blocks. The size and the number of these blocks determine, at least in part, the thermal capacity of the storage unit 102 and, more generally, of the thermal battery system 100. For example, the size of storage unit 102 can be 1,000-10,000 $m^3$, while the size of each block may be 0.5-5 $m^3$. The thermal battery system 100 may further comprise a power block 104 and a piping infrastructure 110 in which a liquid metal (e.g., Sn) may flow between the storage unit 102 and the power block 104 for heat transfer. The thermal battery system 100 may include a heating element 106 that may be configured to heat up the liquid metal in the piping infrastructure 110. The heating element 106 may be powered by an energy source 108.

A thermal battery system 100 exploits the fact that thermal radiation scales with absolute temperature to the fourth power ($P \propto T^4$), in order to achieve high power density and consequently low cost. In concept, the thermal battery system 100 may operate by taking in electricity (e.g., from renewable sources) to power heating elements 106 (e.g., resistive heaters) to a temperature of 1200-2800° C., or more specifically, 1500-2500° C. The heating elements 106 convert the electricity into extremely high-temperature heat, which is then transferred to a power block 104 using a piping infrastructure 110 (e.g., a plumbing network made of graphite that carries liquid tin). The tin is mechanically pumped in the piping infrastructure 110 (forming a circulation loop). When the tin flows adjacent to the heating elements 106, the tin may nominally heat from the incoming lower temperature (e.g., 1900° C.) to an outgoing higher temperature (e.g., 2400° C.). At this higher temperature, the molten tin is then routed to storage unit 102 (e.g., a bank of energy storage blocks (ESBs) made of carbon or graphite). As the liquid metal passes through pipes situated in between block gaps, the ESBs are heated to the peak temperature to fully charge the thermal battery system 100. The storage unit 102 (ESBs) is thermally insulated from the surroundings and can hold the thermal energy for long periods of time (i.e., weeks to months) if needed. When electricity is desired back on the grid, the heating elements 106 are turned off, and the liquid metal is used to carry the sensible heat from the storage unit 102 (ESBs) over to a TPV power block 104. The TPV power block 104 comprises a radiation device 114 with individual cavities that have the liquid metal flowing through its walls, which keep the walls hot. The walls emit light that is then absorbed by the TPV receiver 120 or, more specifically, by the TPV cells and produces electricity (e.g., provided back to the grid).

Overall, the power block 104 is equipped with an array of TPV units 112. Each TPV unit 112 is configured to convert thermal energy (provided by the storage unit 102) into electricity via a combination of heat radiation and photoelectric effects. Each TPV unit 112 comprises a radiation device 114 (which may be referred to as a TPV emitter) and a TPV receiver 120. As noted above, the radiation device 114 may comprise a set of pipes for pumping a thermal fluid (e.g., molten tin), thereby heating the radiation device 114 and producing the radiation, which is then converted by the TPV receiver 120 into electricity. In some examples, the TPV receiver 120 may be retracted (or removed) from the cavity in the radiation device 114 and is referred to as a TPV "stick" due to its extended shape.

Overall, a TPV receiver 120 is configured to operate proximate to a radiation device 114 (i.e., positioned into the cavity of the radiation device 114) while the radiation device 114 is heated to a temperature of 1600-2500° C. or, more specifically, 1900-2500° C. It should be noted that other TPV applications do not involve such high temperatures and do not incur such large heat fluxes or penalties associated with inactive areas.

Various components of the thermal battery system 100 may include graphite-based infrastructures 200, e.g., used for interconnecting two graphite pipes, pump connections, pump assemblies, connections to power blocks 104, connections to storage units 102, and the like. Various examples of the graphite-based infrastructures 200 will now be described in more detail.

Examples of Graphite-Based Infrastructures

Figure 2A:
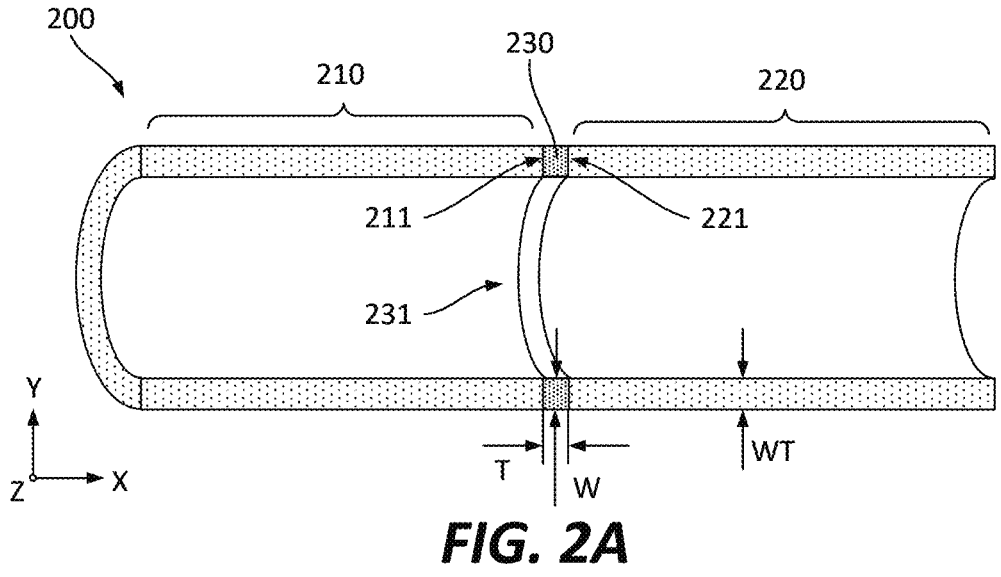
FIG. 2A is a schematic cross-sectional view of a graphite-based infrastructure comprising two graphite structures and a carbide-containing seal positioned between and monolithic with each of the two structures, in accordance with some examples.

FIG. 2A is a schematic cross-sectional view of a graphite-based infrastructure 200 comprising two components (i.e., a first graphite component 210 and a second graphite component 220) and a carbide-containing seal 230 positioned between and monolithic with each of the two components, in accordance with some examples. It should be noted that the first graphite component 210 and/or the second graphite component 220 may be subcomponents of various other components/systems further described above. As stated above, a graphite-based infrastructure 200 can be used for high-temperature applications (e.g., above 1000° C., above 1300° C., or even above 1500° C.).

Specifically, the first graphite component 210 comprises a first-component sealed end 211. The second graphite component 220 comprises a second-component sealed end 221. The carbide-containing seal 230 is positioned between and monolithic with each of the first-component sealed end 211 and the second-component sealed end 221, thereby sealing the first graphite component 210 to the second graphite component 220. As further described below, this carbide-containing seal 230 may be formed by graphite fusing, which combines one or more of diffusion bonding, reaction bonding, and brazing. As such, the carbide-containing seal 230 may also be referred to as a diffusion-bonded seal, a reaction-bonded seal, and/or a brazed seal. The definition of these binding techniques is provided above, while additional aspects are presented below.

Examples of Graphite Structures

In some examples, each of the first graphite component 210 and the second graphite component 220 consists substantially of graphite. For purposes of this disclosure, the term "consists substantially of" is defined as a concentration of at least 95% atomic or at least 98% atomic. Furthermore, the term graphite is used here nominally to mean carbon, but it does not necessarily have to be graphite specifically. Similar construction materials out of amorphous carbon, pyrolytic graphite, carbon fiber composite (CFC), or carbon fiber itself are also contemplated when generically using the term graphite herein. It should be noted that different types of carbon-based material exhibit different results in terms of reactivity, microstructure, and properties.

Referring to FIG. 2A, in some examples, each of the first graphite component 210 and the second graphite component 220 has a wall thickness (WT). The wall thickness (WT) of at least one of the first graphite component 210 and the second graphite component 220 is between 2 mm and 50 mm or, more specifically, between 2 mm and 100 mm.

In some examples, the first graphite component 210 and the second graphite component 220 are made from a graphite material that has one or more of the following properties. For example, the graphite material may have an average particle size of 1-20 micrometers or, more specifically, 2-10 micrometers. The graphite material may have a porosity of up to 10%, up to 15%, or even up to 20%, e.g., 3-15% or 5-10%. The average CTE (along all three directions) of the graphite material may be $1\text{-}10\times10^{-6}/°$ C. or, more specifically, $2\text{-}8\times10^{-6}/°$ C., or even $2\text{-}6\times10^{-6}/°$ C. It should be noted that the CTE of graphite is very anisotropic and varies significantly in different directions (e.g., being potentially negative in one direction). The graphite material may have a density of 1-2.5 g/cm³, such as 1.5-2.0 g/cm³, or even 1.75-1.95 g/cm³.

In some examples, at least one of the first graphite component 210 and the second graphite component 220 is a part of one or more components selected from the group consisting of a pump, valve, elbow, T-junction, flow meter, or tank.

Carbide-Containing Seals—Structural Examples

In some examples, the carbide-containing seal 230 is configured to withstand a temperature of greater than 1500° C., greater than 2000° C., greater than 2500° C., or even greater than 3000° C. or even greater than 1900° C. (a) while subjected to an internal pressure of greater than 0.7 MPa (about 100 psi) or even greater than 1 MPa (about 150 psi) produced by an internal fluid (e.g., a molten metal or, more specifically, molten tin). Withstanding such temperatures means that the carbide-containing seal 230 remains monolithic, sealing both the first-component sealed end 211 and the second-component sealed end 221, and thereby sealing the first graphite component 210 to the second graphite component 220.

Figure 2B:
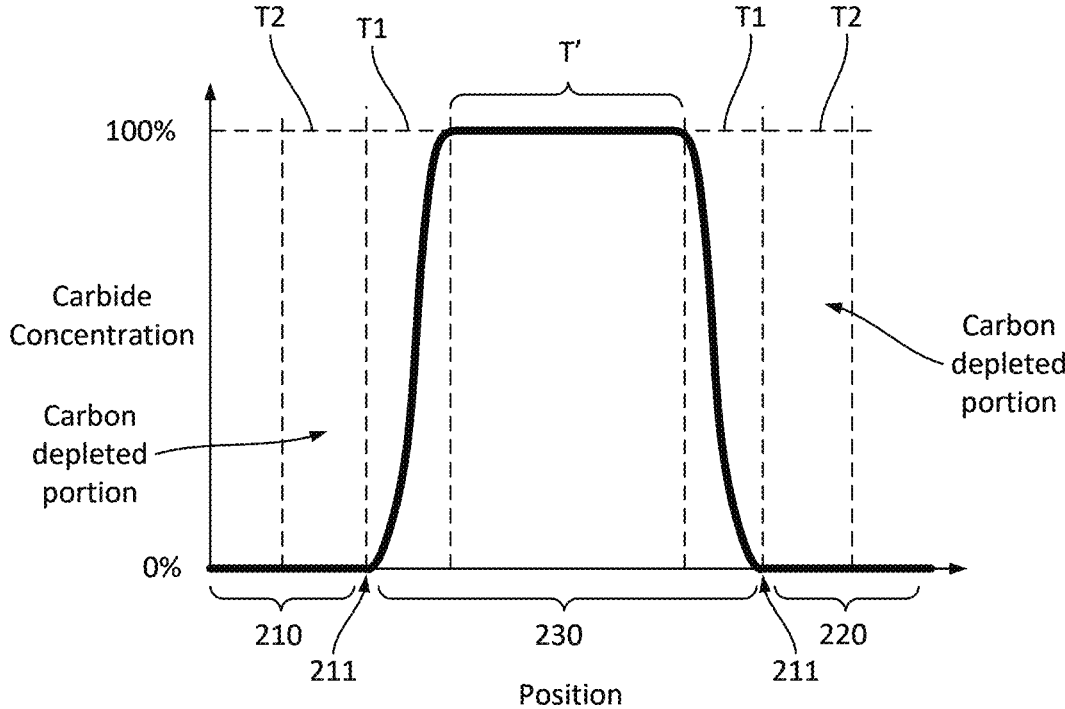
FIG. 2B is a schematic characterization of the composition in a carbide-containing seal and two graphite structures connected by this carbide-containing seal, in accordance with some examples.

Referring to FIG. 2A, the carbide-containing seal 230 has a thickness (T), defined by the shortest distance between the first graphite component 210 and the second graphite component 220 or, more specifically, the first-component sealed end 211 and the second-component sealed end 221. The carbide-containing seal 230 may be distinguished from the first-component sealed end 211 and the second-component sealed end 221 based on the composition, e.g., as shown in FIG. 2B and described below. For example, the first graphite component 210 and the second graphite component 220, or, more specifically, at least the interior portions of the first graphite component 210 and the second graphite component 220, may be substantially free from carbides (e.g., less than 10% by volume or even less than 5%). It should be noted that in some examples, the first graphite component 210 and the second graphite component 220 may include one or more carbides on the exterior surfaces, e.g., as an internal carbide-containing sealing coating 240 further described below. However, unlike the first graphite component 210 and the second graphite component 220, the carbide-containing seal 230 comprises carbide throughout the entire volume. It should be noted that the composition of the carbide-containing seal 230 may not be uniform through its thickness (e.g., the concentration of carbide may go down to a minimal value at the interface with the first-component sealed end 211 and the second-component sealed end 221).

In some examples, the thickness of the carbide-containing seal 230 is less than 500 micrometers, less than 200 micrometers, or even less than 50 micrometers. A thinner carbide-containing seal 230 may help preserve the integrity of the overall high-temperature, graphite-based infrastructure 200, as the compositions of the two graphite structures and the carbide-containing seal 230 differ (e.g., graphite vs. carbide). For example, pyrolytic graphite has a coefficient of thermal expansion (CTE) of $1\text{-}5\times10^{-6}/°$ C., while titanium carbide and tungsten carbide have a CTE of about $7\times10^{-6}/°$ C. However, in some examples, the CTE may be sufficiently close or, e.g., zirconium carbide has a CTE of about $4\times10^{-6}/°$ C., while AR-14 carbide (available from Ohio Carbon Blank in Willoughby, Ohio) has a CTE of $6\times10^{-6}/°$ C. (or $3.33\times10^{-6}/°$ F.). A thinner carbide-containing seal 230 may also experience more reaction bonding and less brazing, or different transient dynamics in between. On the other hand, if the thickness of the carbide-containing seal 230 is larger, the carbide-containing seal 230 may result from more brazing than reaction bonding.

Referring to FIG. 2A, the carbide-containing seal 230 forms an interior opening 231 between the first graphite component 210 and the second graphite component 220. The interior opening 231 is isolated from the environment by the carbide-containing seal 230. In some examples, the cross-sectional area of the interior opening 231, formed by the carbide-containing seal 230, is at least 5 cm$^2$, at least 20 cm$^2$, or even at least 180 cm$^2$. A larger opening provides a greater fluidic throughput within the graphite-based infrastructure 200. However, forming and maintaining the carbide-containing seal 230 around a larger opening can be difficult.

Referring to FIG. 2A, in some examples, the carbide-containing seal 230 forms a ring around the cross-sectional area of the interior opening 231. The ring formed by the carbide-containing seal 230 may have a minimal width (W), measured within a cross-sectional plane and in the same radial direction as the thickness of the graphite structure, of at least 1 millimeter, at least 2 millimeters, or even at least 20 millimeters. A larger width may be beneficial to ensure the mechanical strength of the carbide-containing seal 230 or a longer, more tortuous leak path for the liquid metal. Conversely, a wider bond may experience greater stresses due to a thermal expansion mismatch between the carbide and the joining graphite. In this respect, both the seal width and the choice of graphite grade could be designed to minimize this stress. The width of the carbide-containing seal 230 could be reduced to minimize the length scale associated with the CTE disparity, thereby minimizing the difference in stress. On the other hand, the graphite grade could be selected to match the CTE of the bonding carbide most closely. For example, the CTE of the carbide-containing seal 230 may be within 80% of the CTE of the graphite structures or, more specifically, within 60% or even within 40% (e.g., as reflected with CTE values of various materials presented above).

In some examples, the graphite-based infrastructure 200 can be designed to manage this stress. For example, the geometry of the carbide-containing seal 230 can be chosen so that when the bond forms at high temperature, a zero-stress state is developed at or near the seal material's melting point, i.e., T$_{formation}$ (as would be the case in brazing). For example, zirconium carbide forms at high temperatures (e.g., at least 1800° C.). When the carbide-containing seal 230, formed from zirconium carbide, is cooled to room temperature (e.g., 25° C.), the carbide-containing seal 230 shrinks slightly more than the first graphite component 210 and the second graphite component 220. The carbide-containing seal 230 may be in the form of a ring-shaped face seal, e.g., as shown in FIG. 2A. It should be noted that while the carbide-containing seal 230 or, more generally, the graphite-based infrastructure 200 may be under stress at room temperature, the graphite-based infrastructure 200 is designed to operate at a higher temperature (e.g., above 1500° C.), thereby reducing the stress at the operating temperature. In some examples, the carbide-containing seal 230 is formed by heating a stack of a sealing structure, the first-component initial end, and the second-component initial end to a carbide-forming temperature (e.g., at least 600° C., at least 1000° C., or even at least 1500° C.). This carbide-forming temperature may be within 50%, within 40%, within 30%, or even within 20% of the operating temperature of the graphite-based infrastructure 200.

If one then operates the system at temperatures higher than T$_{formation}$, the system may experience minimally higher stresses (e.g., that could be tensile, if the CTE of the seal is greater than that of the adjoining graphite), since T$_{formation}$ is closer to the intended operating temperature regime than the temperature at which the joint was initially mechanically assembled—i.e., nominally closer to room temperature. Thus, the difference in thermal expansion can be minimized, which may result in a uniform stress profile in the joint/seal (e.g., tensile) while the system is in service. On the other hand, the system may exhibit a different stress profile, e.g., compressive stress in the seal/joint, once it is cooled below T$_{formation}$, for off-design operation or periodic shutdown. Thus, the amount of time spent in each stress state can be engineered into the seal geometry/design. In some examples, a carbide-containing seal 230 may form a sleeve over the first-component sealed end 211 and the second-component sealed end 221 such that when the graphite-based infrastructure 200 cools down, the CTE mismatch (coupled with the dimensions of these components) is used to compress these ends with the carbide-containing seal 230, thereby preserving the sealing characteristics. Furthermore, the carbide-containing seal 230 is mechanically stronger than the graphite structures.

In some examples, a carbide-containing seal 230 may be coupled with one or more other joints (e.g., removable joints). It should be noted that a carbide-containing seal 230 is a permanent joint. If a portion of the system needs to be nondestructively serviced and modified, other removable joints may be used in line with a carbide-containing seal 230. Furthermore, it should be noted that a carbide-containing seal 230 described herein does not have to be used for forming a seal face against a liquid/gas, but can also be used to form permanent bonds between two components. This could be done in the case of affixing mechanical fasteners so that they cannot move or loosen, as they can be bonded in place.

Carbide-Containing Seals—Compositional Examples

In some examples, the average concentration of one or more carbides in the carbide-containing seal 230 is at least 50% atomic, at least 75% atomic, or even at least 90% atomic. The remaining portion of the carbide-containing seal 230 may comprise graphite (e.g., the carbide-containing seal 230 by consuming a portion of the first graphite component 210 and the second graphite component 220 as further described below).

FIG. 2B is a schematic characterization of the composition in a carbide-containing seal, in accordance with some examples. Specifically, a middle part of the carbide-containing seal 230 may be formed substantially (e.g., more than 90% atomic) from one or more carbides. The thickness (T) of this middle part may be 10-300 micrometers, 20-200 micrometers, or 50-150 micrometers. This thickness (T) may depend on the amount of the starting materials (e.g., titanium (Ti), zirconium (Zr)) available to form the carbide-containing seal 230. Furthermore, this thickness (T) may depend on the reactivity of the starting materials with carbon, the diffusivity of the carbon into the starting materials (and corresponding carbides), the diffusivity of the starting materials (and corresponding carbides) into graphite, heating rates, melting temperatures, and many other factors. In some examples, the middle part formed substantially from a carbide is separated from each of the first graphite component 210 and the second graphite component 220 by a transition portion of the carbide-containing seal 230, which corresponds to a variable (e.g., gradual) concentration of the carbides. The thickness of each transition portion (T1) may be 1-50 micrometers, 2-20 micrometers, or 3-10 micrometers. The factors listed above, with reference to the thickness (T), also impact the thickness of each transition portion (T1). Furthermore, in some examples, a portion of each of the first graphite component 210 and the second graphite component 220 that is immediately adjacent to the carbide-containing seal 230 may be carbon-depleted. The thickness of each depleted portion (T2) may depend on the same factors and, in some examples, may be 0.1-1000 micrometers, 1-500 micrometers, 2-200 micrometers, or 3-1000 micrometers. For purposes of this disclosure, "carbon depleted" is defined as a region of structure which has a defect concentration substantially higher than another region (e.g., 10% higher, 20% higher, 30% higher), e.g., due to the diffusion of carbon atoms into the carbide-containing seal 230 while forming the carbide. Over time, when held at high temperatures, such defective or depleted regions may heal by filling vacancies or defects with carbon atoms from elsewhere in the graphite material being bonded. The concentration of defects or depletion zone may then vary with proximity to the bonded region.

The carbide-containing seal 230 may comprise one or more carbides selected from the group consisting of titanium carbide ($TiC_x$), zirconium carbide ($ZrC_x$), and/or hafnium carbide ($HfC_x$), with x being 0.5-1 or, more specifically, 0.7-1 in these and all later $MeC_x$ references made in this disclosure. In some examples, the carbide-containing seal may comprise different and/or additional carbides, such as niobium carbide (NbC, $Nb_2C$), tantalum carbide ($TaC_x$), chromium carbide ($Cr_3C_2$), molybdenum carbide (MoC, $Mo_2C$), tungsten carbide ($WC_x$), silicon carbide (SiC), aluminum carbide ($Al_4C_3$), and boron carbide ($B_4C$).

In some examples, one or more additional carbides or, more specifically, one or more additional elements that will form these additional carbides are added to lower the melting temperature of a sealing structure (used to form the carbide-containing seal 230). Specifically, lowering the melting temperature may be used to enable the flow of these precursor materials to ensure compliance with the carbide-containing seal 230. For example, these additional elements may alloy with the main precursors (e.g., titanium, zirconium, and/or hafnium) to lower their melting temperatures as alloys.

Furthermore, combinations of multiple carbides may be used to mitigate the CTE mismatch between the carbide-containing seal 230 and the graphite structures. For example, a carbide-containing seal 230 may be formed using a combination of a titanium foil having a first thickness and a zirconium foil having a second thickness, stacked between the first-component initial end 213 and the second-component initial end 223. When this stack is heated, a mixed carbide ($Zr_xTi_{1-x}C$) is formed as a carbide-containing seal 230, with the CTE closer to that of graphite. [Would it be possible to provide ranges of the first and second thicknesses?] In some examples, a stack of the sealing structure (used to form the carbide-containing seal 230) comprises two zirconium outer layers and a titanium inner layer, positioned between the two zirconium outer layers. As such, in the resulting carbide-containing seal 230, the distribution of carbides may be uneven, e.g., with more zirconium carbide interfacing the graphite structures and a higher titanium concentration in the middle of the carbide-containing seal 230 and away from the graphite structures.

In specific examples, the carbide-containing seal 230 comprises titanium carbide. In the same or other examples, the carbide-containing seal 230 comprises zirconium carbide. For example, the carbide-containing seal 230 comprises a combination of titanium carbide and zirconium carbide. In this example, the molar ratio of titanium carbide (to a combination of titanium carbide and zirconium carbide) in the carbide-containing seal 230 is at least 5%, at least 10%, and at least 20%. Overall, a combination of titanium carbide and zirconium carbide, e.g., at molar ratios of 1:10 to 10:1 or, more specifically, 1:5 to 5:1 or even 1:2 to 2:1 or 1:1 or 1:6. For example, adding about 25% atomic of zirconium carbide to about 75% atomic of titanium carbide may help to improve the fracture toughness of the resulting material. Furthermore, some combinations of carbides may have a higher melting temperature than individual carbides forming these combinations (e.g., MAX phases, which are layered carbides).

It should be noted that the enthalpy of formation for titanium carbide is less than that of zirconium carbide, and as a result, zirconium carbide has a higher melting point than titanium carbide. Furthermore, titanium (Ti) metal has a lower melting point than zirconium (Zr) metal. This can result in a variety of effects. The higher formation enthalpy of zirconium carbide could give zirconium carbide greater strength and creep resistance at a given peak operating temperature, e.g., 2400° C. Conversely, the lower melting point of titanium metal (Ti) may lend itself more readily to the use of a mobile induction furnace-based approach for forming bonds in the field.

Overall, each titanium carbide, zirconium carbide, and hafnium carbide, all of which are ceramic materials with a rock-salt crystal structure and have a melting point above 3000° C., ensures the integrity of the carbide-containing seal comprising these carbides across the intended operating range of the graphite-based infrastructure 200. Furthermore, these carbides, although they are ceramics, are electrically conductive. For example, electrical conductivity may aid inductive heating during the joining process. For instance, carbides may couple to the field more effectively than the surrounding graphite, which could influence the speed of brazing or, more generally, the speed of graphite fusing and the extent of localized heating.

Furthermore, titanium (Ti) and zirconium (Zr) are particularly useful for graphite fusing (such as brazing) as these metals have lower melting points (i.e., 1668° C. for titanium (Ti) and 1852° C. for zirconium (Zr)). Specifically, these temperatures may be achieved by localized heating of the structure ends with a shrouding structure positioned between these ends to reduce the oxygen partial pressure (and without substantial heating of the surrounding structures). Furthermore, these temperatures can be achieved during the operation of the graphite-based infrastructure 200. As such, in some examples, at least some brazing may occur while the graphite-based infrastructure 200 is in operation (i.e., in-situ brazing/seal forming).

In some examples, the carbide-containing seal 230 also comprises one or more additive carbides to differentiate from the primary carbides (e.g., titanium carbide, zirconium carbide, and hafnium carbide). Some examples of additive carbides include, but are not limited to, niobium carbide, tantalum carbide, chromium carbide, molybdenum carbide, tungsten carbide, silicon carbide, aluminum carbide, boron carbide, manganese carbide, and nickel carbide. One or more additive carbides may be present in the carbide-containing seal 230 at a concentration of less than 20% atomic, less than 10% atomic, or even less than 5% atomic (on average). For example, metals forming these additive carbides (e.g., niobium (Nb), tantalum (Ta), chromium (Cr), molybdenum (Mo), tungsten (W), silicon (Si), aluminum (Al), boron (B), manganese (Mn), nickel (Ni)) may form eutectic liquids with metals of primary carbides. (e.g., titanium (Ti), zirconium (Zr), hafnium (Hf)) thereby allowing for brazing to occur at lower temperatures and/or more consistently.

For example, aluminum (Al) melts at 660° C., which is quite low compared to, e.g., titanium (1668° C.) and zirconium (1855° C.). Stacking one or more layers of aluminum foil with one or more layers of titanium and/or zirconium may form a lower temperature eutectic alloy liquid first at less than 1500° C., less than 1200° C., or even less than 1200° C. For example, $Zr_3Al$ molten alloys form around 1000° C. and may quickly react with the surrounding graphite to form a zirconium-aluminum carbide. The max phase may be very refractory and strong, but could form at a much lower temperature than zirconium carbide since the $Zr_3A$ alloy can be liquid at a much lower temperature.

Furthermore, additive carbides may also change the properties of the final sealing material. For example, adding zirconium carbide to a titanium carbide seal may increase its bond strength or fracture toughness. It should be noted that zirconium carbide and titanium carbide may intermix, not phase separate.

In some examples, one or more additive carbides may be non-uniformly distributed within the carbide-containing seal 230, e.g., forming an interior surface of the carbide-containing seal 230 that comes in contact with the fluid carried through the graphite-based infrastructure 200 (e.g., molten metal such as molten tin), e.g., forming at least a part of the internal carbide-containing sealing coating 240 described below. One or more additive carbides may be selected based on their compatibility with the fluid (e.g., zirconium carbide may be used to interface molten tin due to its corrosion resistance), while a still refractory, yet easier to form carbide such as silicon carbide, may be used elsewhere to comprise a larger volume fraction of the bond, if it has other favorable properties. In the same or other examples, one or more additive carbides may be used to improve adhesion to the graphite structures, as well as mechanical strength, CTE matching, creep resistance, lower temperature requirements for formation, higher hermetic sealing yield, or looser tolerances on acceptable bond processing parameters, and the like.

Compression Fixture Examples

Figure 3A:
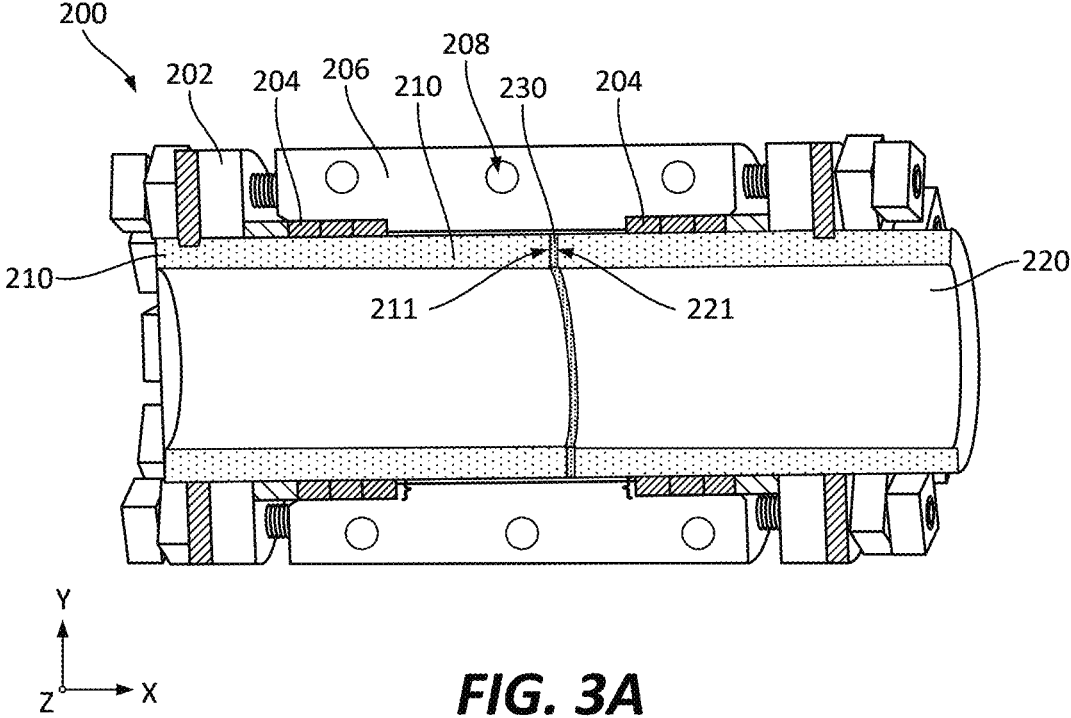
FIG. 3A is a schematic cross-sectional view of a carbide-containing seal with a compression fixture, in accordance with some examples.

FIG. 3A is a schematic cross-sectional view of a carbide-containing seal 230 with a compression fixture 202, in accordance with some examples. The compression fixture 202 may comprise a packing shell 206 positioned around and enclosing the first-component sealed end 211, the carbide-containing seal 230, and the second-component sealed end 221. The packing shell 206 can be operable as a second seal. The compression fixture 202 may be a permanent part of the graphite-based infrastructure 200 or used temporarily during the fabrication of the graphite-based infrastructure 200 (and removed once the carbide-containing seal 230 is formed).

The packing shell 206 may force the first-component sealed end 211 and the second-component sealed end 221 toward each other, e.g., with the pressure of at least 0.2 MPa (about 30 psi), at least 0.35 MPa (about 50 psi), or even at least 0.5 MPa (about 70 psi).

Another important factor is the flatness of the first-component sealed end, 211, the second-component sealed end, 221, and the sealing structure 530. The flatness is defined at the interfaces of these components, e.g., within the Y-Z plane in FIG. 3A. Each of the first-component sealed end, 211, the second-component sealed end, 221, and the sealing structure 530 may be substantially flat.

In some examples, the graphite-based infrastructure 200 further comprises a heating element attached to and thermally coupled to one or both of the first graphite component 210 and the second graphite component 220. For example, referring to FIG. 3A, the packing shell 206 may comprise flow channels 208 for flowing a thermal liquid (e.g., heated oil) to preheat the graphite-based infrastructure 200 before flowing a molten metal through the graphite-based infrastructure 200 or, more specifically, through the first graphite component 210 and the second graphite component 220. Preheating may be used to ensure that the molten metal pumped through the system is not frozen at any particular location and may be performed, e.g., by pumping heated fluids through the system. Once preheated, a molten metal is introduced, and the system can be brought to the operating temperature using the heat from the molten metal. It should be noted that the molten metal provides very uniform heating, e.g., to ensure all bonds (e.g., carbide-containing seals) in the system experience the right temperature profile. Overall, the system may be preassembled at an operating location without carbide-containing seals formed. Instead, sealing structures may be provided. Once the system reaches the operating temperature for the specified time, the sealing structures are converted into carbide-containing seals, a process referred to as the in situ formation of carbide-containing seals. In some examples, the first heating profile may be specifically tailored to form these carbide-containing seals and may be different from a typical operating profile. A sealing structure may be used by itself and be directly exposed to the molten metal (e.g., when the sealing structure is formed from tungsten, which doesn't form any alloys with tin). Alternatively, a sealing structure may be isolated from the molten metal by a secondary seal as further described below.

Referring to FIG. 3A, in some examples, the graphite-based infrastructure 200 further comprises a secondary sealing structure 204 compressed against at least one of the first graphite component 210 and the second graphite component 220, isolating the carbide-containing seal 230 from the environment. The secondary sealing structure 204 comprises a flexible graphite sheet (e.g., GraFoil), graphite gasket, packing rope, ferrule, or ring.

Internal Surface Coatings

Figure 3B:
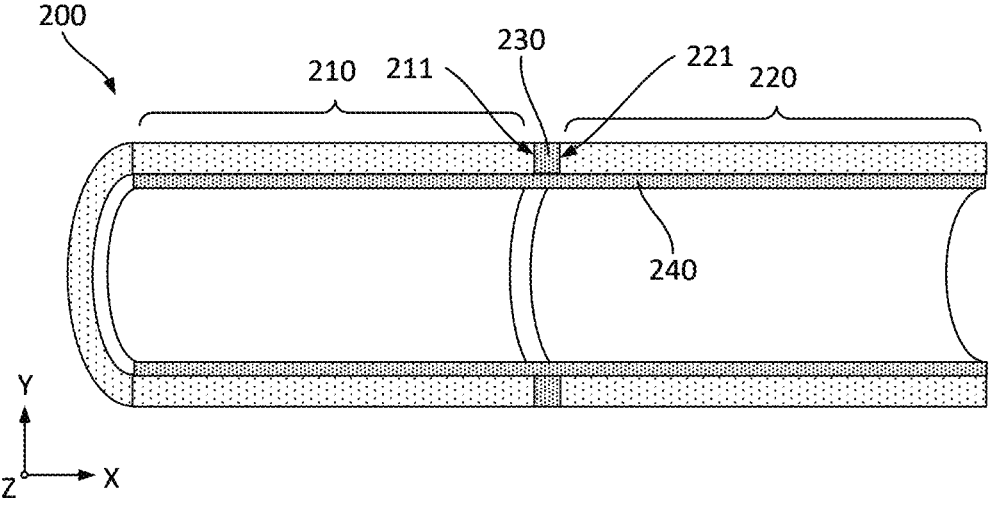
FIG. 3B is a schematic cross-sectional view of an assembly comprising a carbide-containing seal and an internal carbide-containing sealing coating, in accordance with some examples.

Referring to FIG. 3B, in some examples, a graphite-based infrastructure 200 may comprise an internal carbide-containing sealing coating 240, e.g., in addition to or instead of forming a carbide-containing seal 230. The internal carbide-containing sealing coating 240 may comprise one or more carbides selected from the group consisting of titanium carbide, zirconium carbide, and hafnium carbide. In some examples, the carbide-containing seal 230 may comprise different or additional carbides, such as niobium carbide, tantalum carbide, chromium carbide, molybdenum carbide, tungsten carbide, silicon carbide, aluminum carbide, boron carbide, manganese carbide, and nickel carbide. In some examples, the composition of the internal carbide-containing sealing coating 240 is the same as that of the carbide-containing seal 230, e.g., to keep these components chemically compatible. Alternatively, the internal carbide-containing sealing coating 240 and carbide-containing seal 230 have different compositions, e.g., the internal carbide-containing sealing coating 240 being more resistant to the working fluid (e.g., molten metal) and blocking the contact between the working fluid and the carbide-containing seal 230. In some examples, the thickness of the internal carbide-containing sealing coating 240 may be 1-200 micrometers or, more specifically, 5-100 micrometers, such as 10-50 micrometers.

An internal carbide-containing sealing coating 240 may be formed in situ, e.g., by doping/alloying the tin (Sn), pumped through the graphite-based infrastructure 200 as a molten metal, with one or more other elements that would form carbides with the graphite of the first graphite component 210 and the second graphite component 220. When the dissolved elements (e.g., titanium (Ti), zirconium (Zr)) come in contact with the graphite structures (at the operating temperature of the graphite-based infrastructure 200), the dissolved elements react with carbon on the interior surface of these graphite structures. In some examples, the concentration of these dissolved elements in the molten tin may be less than 10% atomic, less than 5% atomic, or even less than 3% atomic (e.g., 1-5% atomic). At such low concentrations, the characteristics of molten tin remain sufficiently unaffected.

It should be noted that the in-situ formation of the internal carbide-containing sealing coating 240 also makes it a sealing coating and a self-healing coating. In other words, if a portion of the internal carbide-containing sealing coating 240 is missing and the graphite surface of the graphite structure is exposed, the dissolved elements will react with the carbon of the exposed portion and form the missing coating. The process of self-healing continues while the working fluid (e.g., molten tin (Sn)) has these other coating-forming elements dissolved in, and the temperature of the working fluid is sufficiently high (e.g., greater than 1500° C. or even greater than 2400° C.).

In some examples, an internal carbide-containing sealing coating 240 is formed prior to introducing the working fluid to the high-temperature, graphite-based infrastructure 200. For example, a precursor (e.g., a silicon-containing polymer such as GraphiSeal, available from CeraMaterials in Dingmans Ferry, PA) and comprising polycarbosiloxan) may be used to coat the internal surface of the first graphite component 210 and the second graphite component 220. Thereafter, the graphite-based infrastructure 200 may be heated externally or by flowing a heated gas through the graphite-based infrastructure 200, to convert this precursor coating into carbon, or a carbide (e.g., silicon carbide). For example, methane may be flown through the graphite-based infrastructure 200 and pyrolyzed in the graphite pores, leaving behind carbon that fills the pores and makes the graphite gas-tight. In some examples, a silicon-containing precursor may be used with the vapor going into the graphite pores to form silicon carbide.

In some examples, a precursor comprises graphite particles, which may be used to plug pores (thereby increasing hermeticity and chemical stability of graphite structures) and react with other materials in the precursor. The graphite particles may be carried in a liquid that has good carbon-wetting characteristics (e.g., water with a surfactant/soap). It should be noted that graphite particles do not react with the graphite structures. However, in other examples, a precursor may comprise carbon-reactive/carbide-forming particles that react with the carbon surface of the graphite structures when the high-temperature, graphite-based infrastructure 200 is brought to the carbide-forming temperatures (e.g., due to pyrolysis). These carbon-reactive/carbide-forming particles may be delivered together with silicon-containing polymer and/or water. Similar to graphite particles, the carbon-reactive/carbide-forming particles may block the pores in graphite structures.

It should be noted that external heating may be necessary only to ensure that the working fluid is within a desired operating range (e.g., tin (Sn) remains in the molten state). The working fluid may be heated at one location in the system and pumped (in this heated state) throughout the system, thereby triggering the carbide-forming reaction. It should also be noted that the internal seal may also span the joint between the two graphite structures, thereby forming a portion/version of a carbide-containing seal 230.

This internal carbide-containing sealing coating 240 may protect the graphite structures from various internal components, e.g., from contact with liquid tin (which may leak as a vapor through the graphite structures). Specifically, at operating temperatures of the graphite-based infrastructure 200 (e.g., over 1500° C., over 1900° C., such as about 2400° C.), tin's vapor pressure is quite substantial, and graphite may be appreciably porous to tin gas (causing tin losses from the system and contamination of the environment). Having an inner carbide coating/crust could help prevent gaseous tin from escaping the system over time.

Stacked Seals

In some examples, a carbide-containing seal 230 is formed using a combination of two or more sealing structures and may be referred to as a stacked carbide-containing seal. For example, a first sealing structure may be a metal foil, while a second sealing structure may be a flexible graphite sheet (e.g., GRAFOIL® available from NeoGraph Solutions in Lakewood, Ohio), die-formed ferrule, and/or packing rope. The stacking may be in the axial direction (e.g., along the X-axis in FIG. 3B) and/or a radial direction (parallel to the Y-Z plane). For example, a graphite sheet may be used as a temporary inner seal that comes in contact with the working fluid (e.g., molten tin) until a metal foil reacts with the carbon of the graphite structures and forms a carbide portion of the carbide-containing seal 230. Specifically, the graphite sheet may provide a temporary, elastic seal during initial cycles, thereby allowing for the metal to have sufficient time to reach (e.g., melt/flow, diffuse) carbon on the surface and surface voids of the graphite structures (without a risk of being washed by the working fluid (e.g., molten tin (Sn)). It should be noted that many metals (e.g., zirconium (Zr)) are not inert to molten tin (Sn) (e.g., may be soluble within the tin), while their carbides are inert (forming in situ, becoming the permanent, robust barrier).

In these examples, the heat required for joint formation (i.e., converting the sealing structure into a carbide-containing seal) can be obtained by simply operating the system in which the components are embedded, allowing the joint to form in situ during usage. In other words, a sealing structure may be positioned between the structure ends, but it is not formed until at least the first use of the system (e.g., by flowing molten tin through the graphite structures). It should be noted that the system operation/reheating of the graphite structures may be used to enhance the carbide-containing seal repeatedly.

It should be noted that a graphite sheet is capable of forming a conformable seal that can be stacked up to compensate for the much lower CTE associated with carbon fiber composites (CFC), which could be used as fasteners. It should be noted that graphite sheets are compressible (squishy), so it is able to take up the difference between CTEs and maintain close contact without generating excessive stress.

CFC has a thermal expansion coefficient that is about 10 times smaller than that of graphite. As such, a graphite sheet allows the use of CFC fasteners (e.g., bolts and nuts, as shown in FIG. 3A) to provide clamping force. Specifically, when the operation temperature of the high-temperature, graphite-based infrastructure 200 increases, the CFC structures (e.g., fasteners) do not expand as much as the graphite structures, thereby increasing the clamping force on the carbide-containing seal 230. Overall, the graphite sheet (e.g., GRAFOIL®) may be 0.1-200 millimeters thick or, more specifically, 0.5-100 millimeters thick or even 5-50 millimeters thick, and accommodates the mismatch in thermal expansion by compressing and getting squished. In some examples, multiple graphite sheets may be stacked to provide a compliant intermediate region that, e.g., accommodates differential thermal expansion between graphite components.

In some examples, the materials of two or more sealing structures may also react with each other (e.g., the metal of the first sealing structure may react with the carbon of the second sealing structure).

Figures 3C, 3D:
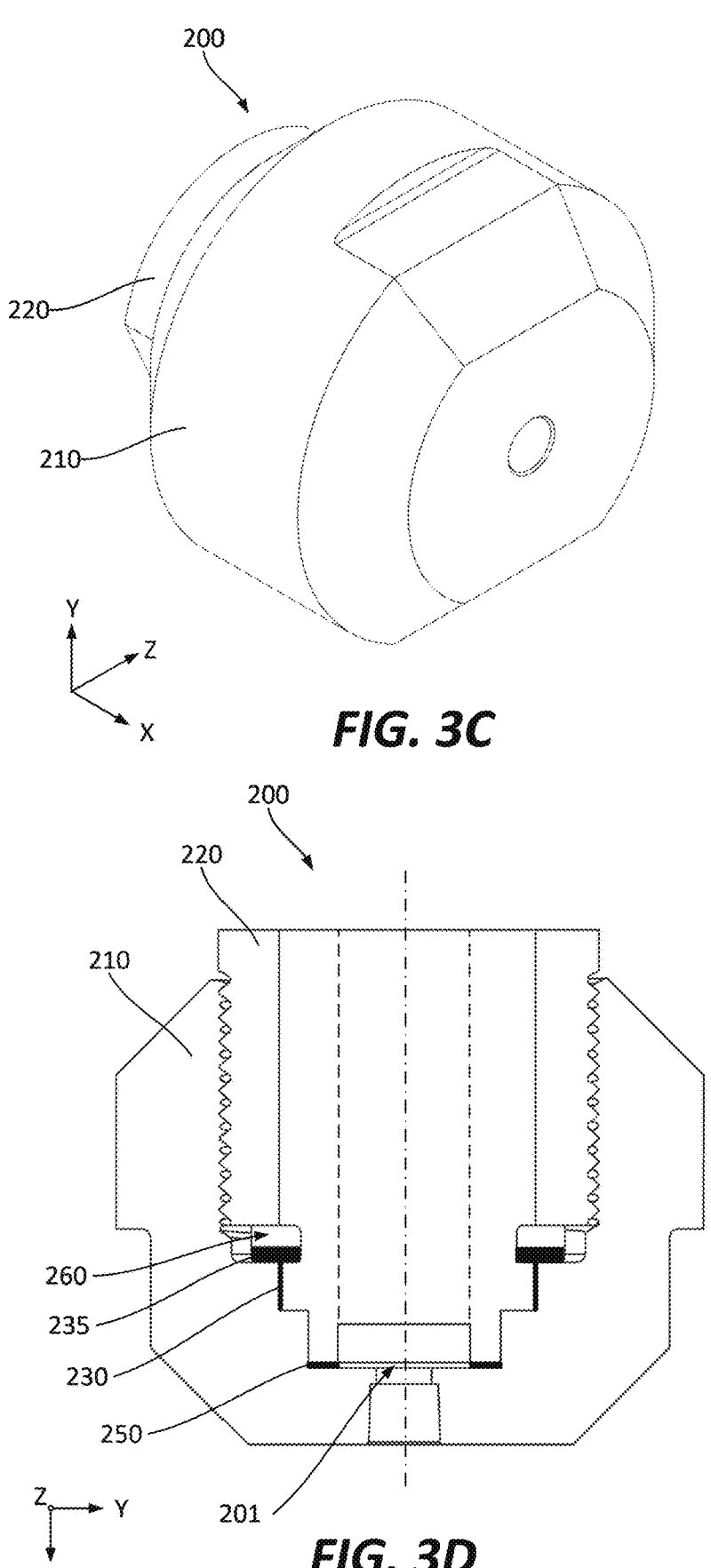
FIGS. 3C-3F illustrate various examples of a graphite-based infrastructure comprising a carbide-containing seal and a secondary seal.

FIGS. 3C and 3D illustrate an example of the graphite-based infrastructure 200 comprising a carbide-containing seal 230 and a secondary seal 250, each interfacing both the first graphite component 210 and the second graphite component 220. The secondary seal 250 is exposed to the infrastructure opening 201, while the carbide-containing seal 230 is isolated from the infrastructure opening 201 by the secondary seal 250. Specifically, when a molten metal is introduced into the infrastructure opening 201, the molten metal may come in contact with the secondary seal 250. As noted above, the secondary seal 250 allows the carbide-containing seal 230 to be formed in situ (e.g., protecting the sealing structure from contact with the molten metal while forming the carbide-containing seal 230).

Referring to FIGS. 3C and 3D, the high-temperature, graphite-based infrastructure 200 also comprises a sealing material storage opening 260, positioned proximate to the carbide-containing seal 230. For example, in addition to the sealing structure compressed between the graphite structures, the sealing-material-storage opening 260 may contain a sealing material 235 (e.g., in the form of pellets) to be supplied into the space between the graphite structures, supplementing the sealing structure. Specifically, the sealing material may be consumed to form the carbide-containing seal 230, which may also extend into the pores of the graphite structures and occupy additional voids. The sealing material 235 (in the sealing-material-storage opening 260) may be melted (when the graphite structures are heated) and fed into the space to form the carbide-containing seal 230 (e.g., gravity fed, capillary fed, and/or pressurized). In some examples, the initial sealing structure (between the graphite structures) may not be used, and the carbide-containing seal 230 may be formed entirely from the melted sealing material 235 that is fed into the gap between the graphite structures.

Figure 3E:
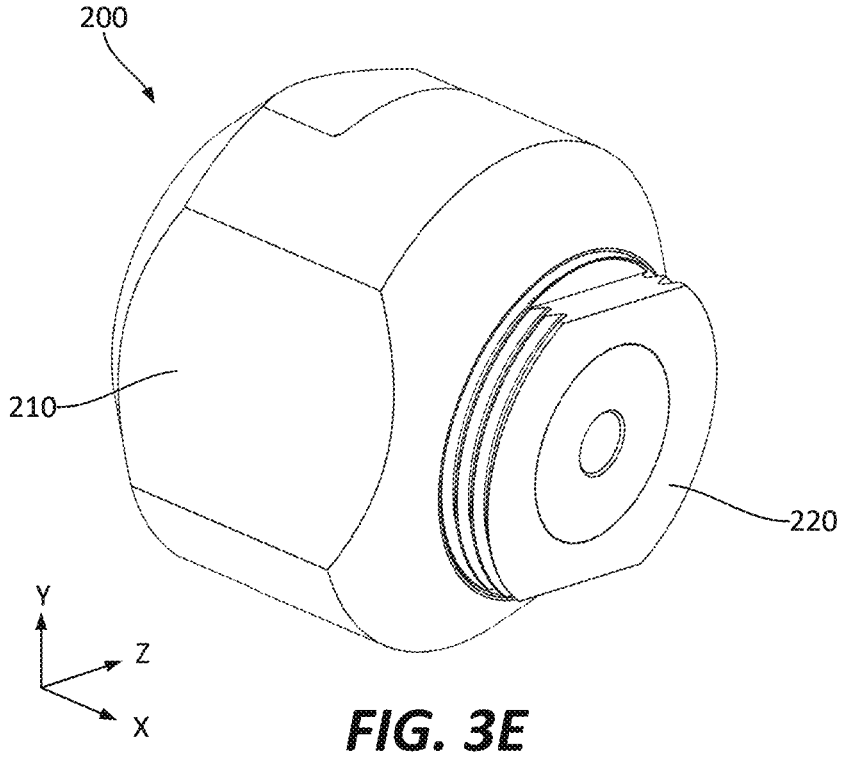
Figure 3F:
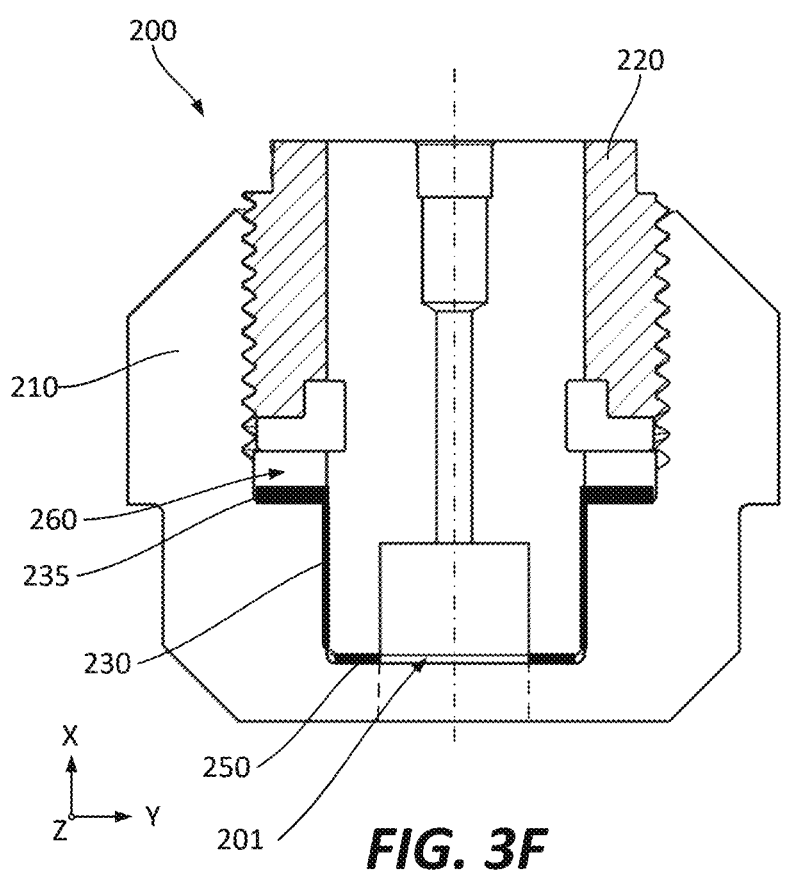

FIGS. 3E and 3F illustrate another example of a high-temperature, graphite-based infrastructure 200 comprising a carbide-containing seal 230 and a secondary seal 250 such that the secondary seal 250 isolates the carbide-containing seal 230 from the infrastructure opening 201. An example is FIG. 3D may be a face seal, where the foil (the sealing structure) is compressed axially, with an additional sealing material 235 positioned behind that foil to feed in and fill any radial space for a bigger bond/longer, more tortuous leak path. An example is FIG. 3E may be a radial seal, where the foil is compressed radially and is fed by an additional sealing material 235 behind it.

In some examples, an external circumferential seal may further enable modular repair, e.g., damaged or worn seals can be cut away and replaced by installing a new metallic band, which is then reheated to reform the carbide bond without removing the underlying graphite structures.

Furthermore, in some examples, a radial offset of the carbide-containing seal 230 and the secondary seal 250 may be used to combine sealing and mechanical support aspects. For example, the secondary seal 250 (e.g., formed from a graphite sheet) may be positioned on the inside of the carbide-containing seal 230 (e.g., formed from zirconium carbide). The carbide-containing seal 230 may be allowed to crack and not provide hermetic sealing, e.g., due to the CTE mismatch with the graphite structures. However, the carbide-containing seal 230 may remain structurally supportive to the secondary seal 250, which in turn provides hermetic sealing. As such, the combination of these seals allows the support of both the pressure and temperature variations during the operation of the graphite-based infrastructure 200.

Methods of Forming Graphite-Based Infrastructures

FIG. 4 is a process flowchart corresponding to method 400 of forming a graphite-based infrastructure 200, in accordance with some examples. Some aspects of the graphite-based infrastructure 200 are described above.

Method 400 may comprise (block 410) compressing a sealing structure 530 between a first graphite component 210 and a second graphite component 220. The first graphite component 210 comprises a first-component initial end 213 that directly interfaces with the sealing structure 530. The second graphite component 220 comprises a second-component initial end 223 that directly interfaces with the sealing structure 530, e.g., as schematically shown in FIGS. 5A and 5B. The first-component initial end 213 and second-component initial end 223 may be consumed while forming the carbide-containing seal 230, resulting in the first-component sealed end 211 and second-component sealed end 221.

Each of the first graphite component 210 and the second graphite component 220 comprises graphite. The sealing structure 530 comprises one or more metals selected from the group of titanium (Ti), zirconium (Zr), and hafnium (Hf).

The sealing structure 530 may comprise a metal wire that forms a ring around the openings in the first graphite component 210 and the second graphite component 220. In another example, the sealing structure 530 is a metal foil having a thickness of 25-125 micrometers. In some examples, the sealing structure 530 has a 3D shape selected from the group consisting of a cylinder, a bottle cap, and a ferrule.

In some examples, compressing the sealing structure 530 between the first graphite component 210 and the second graphite component 220 is performed (block 412) using a compression fixture comprising a first clamp 510, engaging the first graphite component 210, and a second clamp 520, engaging the second graphite component 220, e.g., as schematically shown in FIG. 5B. Each of the first clamp 510 and the second clamp 520 may be positioned at least 10 millimeters away from the sealing structure 530 or, more specifically, at least 100 millimeters away or even at least 200 millimeters away.

In some examples, each of the first clamp 510 and the second clamp 520 is formed from a refractory material, thereby allowing these clamps to be closer to the sealing structure 530. The refractory material, forming each of the first clamp 510 and the second clamp 520, is selected from the group consisting of graphite and tungsten.

In some examples, method 400 further comprises (block 440) removing the compression fixture after the carbide-containing seal 230 is formed. Alternatively, the compression fixture remains part of an overall seal between the first graphite component 210 and the second graphite component 220, or, more generally, part of the high-temperature, high-pressure, graphite-based infrastructure 200. In some applications, graphite-based infrastructure 200 may be referred to as a thermal-battery piping assembly. However, other applications, such as methane pyrolysis, plastic pyrolysis, liquid-droplet heat exchangers, shell-tube heat exchangers, printed-circuit heat exchangers, thermal batteries with combustion, molten salt/glass/oxide piping, and industrial heat transfer (e.g., from thermal batteries), are also within the scope. For example, graphite piping systems may be used for steel and metalworking (e.g., melting, forging, casting, annealing), glass manufacturing (e.g., melting raw materials), ceramics and cement manufacturing (e.g., for kilns used to fire ceramics and produce cement), chemical and petrochemical manufacturing (e.g., refining, cracking, and polymer production), food and beverage (e.g., cooking, pasteurization, drying, and baking), paper and pulp (e.g., drying paper and treating pulp), pharmaceutical (e.g., sterilization, drying, and chemical reactions), textile (e.g., dyeing, drying, and textile finishing processes), waste management (e.g., incineration and thermal decomposition processes), and the like. For example, steel pipes/structures are generally limited to applications of up to 1000° C. Furthermore, various components of turbines can be made from graphite (and operated with noble gases as working fluids).

In some examples, the sealing structure 530 is compressed between the first graphite component 210 and the second graphite component 220 at a pressure of –7-700 kPa (about 1-100 psi) or, more specifically, 70-3,500 kPa (about 10-500 psi) or even 350-7,000 kPa (about 50-1000 psi) (based on the cross-sectional area of the sealing structure 530 that is in contact with the first graphite component 210 and the second graphite component 220).

In some examples, the sealing structure 530, the first-component initial end 213, and the second-component initial end 223 are positioned in a low-oxygen environment when heated to form the carbide-containing seal 230. For purposes of this disclosure, "a low-oxygen environment" is defined as an environment with an oxygen content of less than 1% molar or even less than 0.1% molar.

For example, method 400 may comprise (block 425) forming the low-oxygen environment around the sealing structure 530, the first-component initial end 213, and the second-component initial end 223 by (a) sealing an enclosure to the first graphite component 210 and the second graphite component 220, and (b) flowing an inert gas into the enclosure as well as into the first graphite component 210 and the second graphite component 220.

Method 400 may proceed with (block 430) heating the sealing structure 530, the first-component initial end 213, and the second-component initial end 223 to at least 1000° C., thereby (a) forming a carbide-containing seal 230 by converting the sealing structure 530, the first-component initial end 213, and the second-component initial end 223 into the carbide-containing seal 230 and (b) forming a first-component sealed end 211 and a second-component sealed end 221 as, e.g., schematically shown in FIGS. 5C and 5D.

Additional details/steps of the carbide-containing seal formation are shown in FIGS. 6A-6C. Specifically, FIG. 6A illustrates a step at which the sealing structure 530 is initially positioned between the first-component initial end 213 and the second-component initial end 223. The pre-melting temperature (T1) at this stage may be room temperature. FIG. 6A illustrates possible cracks and surface imperfections in the first graphite component 210 and the second graphite component 220. Furthermore, various interface voids may be present between the sealing structure 530 and each of the first-component initial end 213 and the second-component initial end 223, e.g., due to surface roughness.

FIG. 6B illustrates a step at which at least the sealing structure 530 is heated above the melting temperature of the material forming the sealing structure 530 (e.g., titanium). The molten material can fill various voids (e.g., in the first graphite component 210 and the second graphite component 220) and at the surface interface. Furthermore, this molten material may provide diffusion pathways for carbon into the bulk of the sealing structure 530. Some carbide formation may start at this step.

FIG. 6C illustrates a step at which at least the sealing structure 530 is fully converted into the carbide-containing seal 230, i.e., all starting material of the sealing structure 530 is converted into the corresponding carbide of the carbide-containing seal 230. Migration of the carbon from the first graphite component 210 and the second graphite component 220 (to form the carbide) may create zones of carbon depletion in the portions of the first graphite component 210 and the second graphite component 220 that are adjacent to the carbide-containing seal 230.

As noted above with reference to FIG. 2A, the carbide-containing seal 230 is positioned between and monolithic with each of the first-component sealed end 211 and the second-component sealed end 221, thereby sealing the first graphite component 210 and the second graphite component 220. The carbide-containing seal 230 comprises one or more carbides selected from the group consisting of titanium carbide, zirconium carbide, and hafnium carbide. The carbide-containing seal 230 is configured to withstand a temperature of greater than 1500° C. (a) while subjected to an internal pressure of greater than 0.7 MPa (about 100 psi) produced by a molten tin flown through the first graphite component 210 and the second graphite component 220 and (b) while remaining monolithic with each of the first-component sealed end 211 and the second-component sealed end 221 and sealing the first graphite component 210 to the second graphite component 220.

In some examples, the sealing structure 530, the first-component initial end 213, and the second-component initial end 223 are heated to at least 2000° C. or even at least 2500° C. For example, one or more metals of the sealing structure 530 have a melting temperature. The sealing structure 530, the first-component initial end 213, and the second-component initial end 223 may be heated above the melting temperature of one or more metals of the sealing structure 530.

In some examples, heating the sealing structure 530, the first-component initial end 213, and the second-component initial end 223 is performed by (block 432) flowing molten tin (Sn) through the first graphite component 210 and the second graphite component 220. Specifically, before heating, method 400 may comprise (block 420) sealing a first interface between the sealing structure 530 and the first-component initial end 213 and a second interface between the sealing structure 530 and the second-component initial end 223 before flowing molten tin (Sn) through the first graphite component 210 and the second graphite component 220. Various heating rates are within the scope. For example, the sealing structure 530, the first-component initial end 213, and the second-component initial end 223 are heated between 100° C. and 1500° C. at an average rate of 10-4000° C./min, or more specifically, at an average rate of 100-10000° C./min.

In some examples, the sealing structure 530, the first-component initial end 213, and the second-component initial end 223 are (block 434) heated locally using a localized induction heater positioned proximate to the sealing structure 530, the first-component initial end 213, and the second-component initial end 223, e.g., as schematically shown in FIG. 5B.

Overall, the carbide-containing seal 230 is formed by one or more techniques selected from the group consisting of (a) brazing the sealing structure 530 with each of the first-component initial end 213 and the second-component initial end 223, (b) reaction bonding the sealing structure 530 with each of the first-component initial end 213 and the second-component initial end 223, and (c) diffusion bonding the sealing structure 530 with each of the first-component initial end 213 and the second-component initial end 223.

In some examples, heating the sealing structure 530, the first-component initial end 213, and the second-component initial end 223 is repeated multiple times to form and repair the carbide-containing seal 230 continuously. For example, heating the sealing structure 530, the first-component initial end 213, and the second-component initial end 223 is repeated multiple times during operation of the graphite-based infrastructure 200 by flowing a molten tin (Sn) through the first graphite component 210 and the second graphite component 220.

A carbide-containing seal may be formed by using a sealing structure that monolithically integrates with the ends of two graphite structures. For example, a sealing structure may be in the form of a 2D thin foil (e.g., 25-500 micrometers thick) to provide a uniform thickness of the carbide-containing seal. One example of a carbide-containing seal is a part of the overall thermal-battery piping assembly that has a composition different from that of the sealed structures. In this example, the carbide-containing seal is a portion of the overall thermal battery piping assembly that comprises a metal carbide. In some examples, a sealing structure may be a 1D structure (e.g., a wire), a 2D flat foil sheet or gasket, or a 3D structure (e.g., a shaped foil) that conforms to the sealing surfaces. Overall, a sealing structure may be a formed/stamped shape. The sealing structure may melt and react in place when situated between graphite components.

For example, two graphite structures can be pressed together with a titanium (Ti) foil sandwiched between the ends of these structures. The foil thickness may be 25-125 micrometers. Pressure (e.g., 70-2000 kPa/about 10-300 psi) can be applied to the foil during initial assembly before the foil is heated (e.g., to a temperature of 1000-2500° C.) and melted. It should be noted that the pressure may increase during the heating due to the thermal expansion of the foil (and other components). Therefore, restricting the mobility (e.g., clamping) of the graphite structures that contact the foil before heating may be sufficient to achieve the target pressure levels. In some examples, a set pressure is applied to the foil before heating.

The graphite structures could be externally clamped, e.g., far enough away from the sealing structure (joint formation zone) so that the clamping process need not involve temperature-resistant materials (e.g., refractory materials). Alternatively, these graphite structures could be supported by and pressed against the sealing structure (e.g., titanium (TI) foil) by refractory (e.g., graphite) clamps or fasteners, such that the fasteners also experience and survive (or are sacrificial) the heating required to form the joint. A carbide-containing seal, which is formed in this process, may be in the form of a fused joint.

Overall, some initial reaction and/or diffusion bonding between the graphite components and the sealing structure may occur during the heating of this assembly. This is to say that graphite and the metal of the sealing structure (e.g., Ti, Zr, or both) may begin to experience a solid-to-solid reaction at elevated temperatures that are still below the melting point of the metal. During this reaction, one or more carbides may be formed (e.g., $TiC_x$, $ZrC_x$, or $Ti_xZr1\text{-}xC_y$). As the heating continues above the melting temperature of the metal, the graphite fusing process is added to the reaction and/or reaction/diffusion bonding. Additional reaction and/or diffusion bonding may occur now as molten metal penetrates further into the graphite structures (e.g., surface cracks, pores).

It should be noted that the formation of titanium carbide and/or zirconium carbide is strongly thermodynamically favored. The reaction, once the metal melts, may occur quite rapidly, in seconds or minutes. It is possible that during the melting event, the molten metal moves into and fills potential voids that might exist before melting (even though some reaction and/or diffusion bonding may have already occurred). Specifically, once the melting point is passed, a molten metal (e.g., liquid Ti and/or Zr) experiences accelerated transport of carbon (from the structure ends) into the carbide-containing seal as it is formed from the molten metal and carbon (e.g., reacting with molten metal to form titanium carbide and/or zirconium carbide). Since the carbide-containing seal (comprising titanium carbide and/or zirconium carbide) has a much higher melting point than the sealing structure (comprising titanium and/or zirconium), the process described herein could be considered graphite fusing. Overall, the brazing aspects (caused by melting) or, more generally, graphite fusing can provide stronger, denser, and leak-resistant joints.

Without being restricted to any particular theory, it is believed that the application of external pressure to the joint (i.e., by pressing the graphite structures against the sealing structure) could also facilitate better adhesion or filling of voids, as the metal foil will become soft and more easily deformable as it approaches its melting point.

In some examples, the heating of a sealing structure may not reach the melting point of the metal forming this sealing structure, and/or the metal is chemically consumed (converted into a corresponding carbide) before this melting point is reached. As such, the carbide-containing seal is formed by direct diffusion/reaction bonding (without reaching the brazing conditions).

A carbide-containing seal may be formed using a fast, repeatable, and reliable joint formation at a factory or in the field at an installation site. For example, a field deployment rig (FDR) may be used to clamp onto two graphite components being joined (e.g., two structure ends). This FDR may comprise a shield for air, such that oxygen would be largely barred from participating in the reaction or negatively impacting the formation of the joint. Specifically, the shield may be a thermally insulated shroud that could contain ports for gas inlet and outlet, as well as gas monitoring, temperature measurement, and/or additional metrology (e.g., cameras). The FDR may contain a resistive heater, a radiative heater, and/or an inductive heater for heating the sealing structure while the carbide-containing seal is formed. It should be noted that, in some examples, the components being joined themselves could serve as the resistors being used in a resistive or inductive heating configuration. The FDR may bring the sealing structure through a sequence of temperatures, with hold times and cooling, to replicate a specific recipe that has been optimized, e.g., for joint strength, density, leak tightness, or resilience to thermal cycling. The gas inlet/outlet can be used to flow in an inert gas (e.g., N2, Ar, He) and purge out air, protecting all materials involved from oxidation.

In some examples, method 400 further comprises (block 450) coating interior surfaces of the first graphite component 210 and the second graphite component 220 with a precursor and (block 455) forming an internal carbide-containing sealing coating 240 from the precursor. Various examples of the precursor and corresponding carbide-containing sealing coating 240 are described above. For example, the precursor may comprise one or more components selected from the group consisting of a silicon-containing polymer, graphite particles, and metal particles.

In some examples, (block 455) forming the internal carbide-containing sealing coating 240 comprises heating the precursor. More specifically, (block 455) heating the precursor is performed while (block 430) heating the sealing structure 530, the first-component initial end 213, and the second-component initial end 223 as described above. In other words, the internal carbide-containing sealing coating 240 and the carbide-containing seal 230 may be formed simultaneously.

In some examples, method 400 further comprises (block 460) flowing a molten metal through the graphite-based infrastructure 200, e.g., as a part of operating a thermal battery system 100. Specifically, flowing molten may pressurize the infrastructure opening 201 to at least 0.7 MPa (approximately 100 psi) or even at least 1 MPa (approximately 150 psi). The molten metal (e.g., molten tin) may be at a temperature of at least 1500° C., or even at least 1900° C., or even at least 2300° C., such as approximately 2400° C. Flowing the molten metal through the high-temperature, graphite-based infrastructure 200 at these conditions does not cause any appreciable penetration of the molten metal through the high-temperature, graphite-based infrastructure 200, e.g., because some molten metals have high vapor pressures at these temperatures, while graphite structures may have sufficient porosity.

EXPERIMENTAL RESULTS

Figure 7:
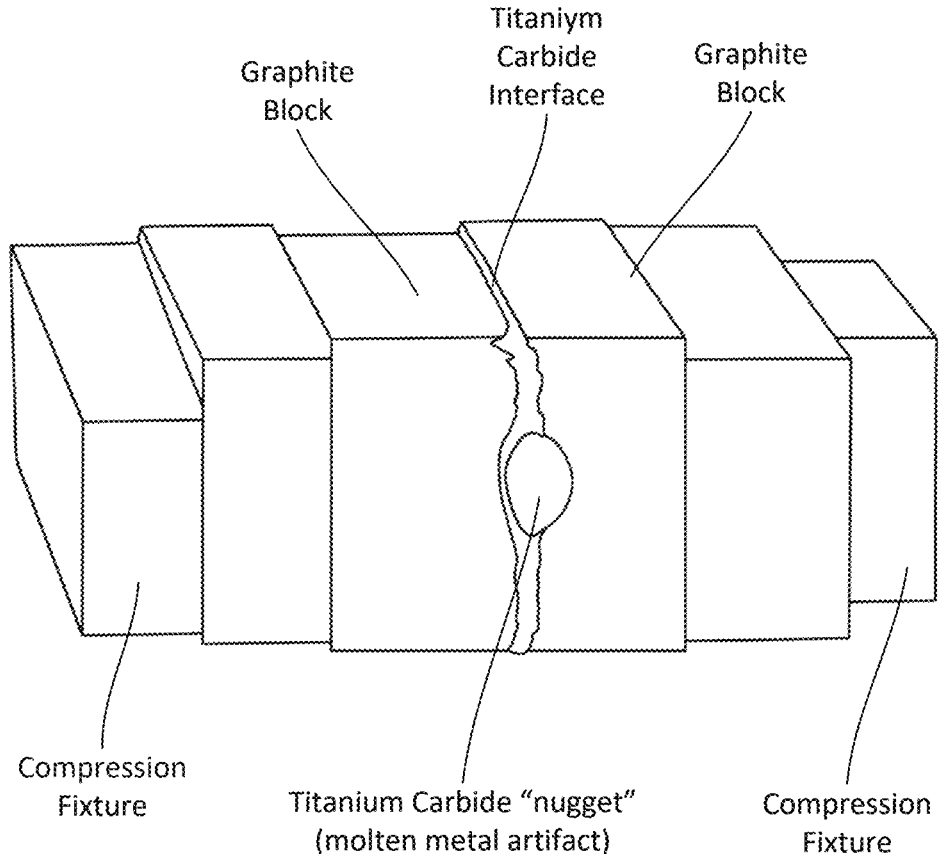
FIG. 7 is a photo of two graphite blocks joined by a titanium carbide structure.
Figure 8A:
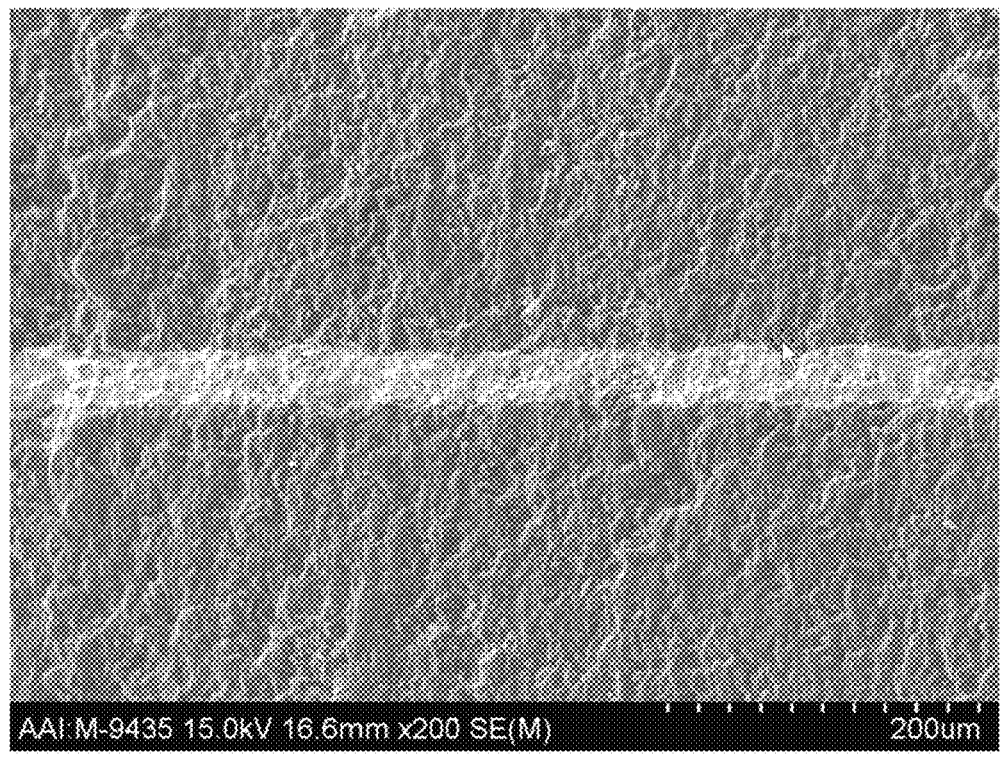
FIGS. 8A-8D are scanning electron microscope (SEM) images illustrating zirconium carbide seals positioned between two graphite structures.
Figure 8B:
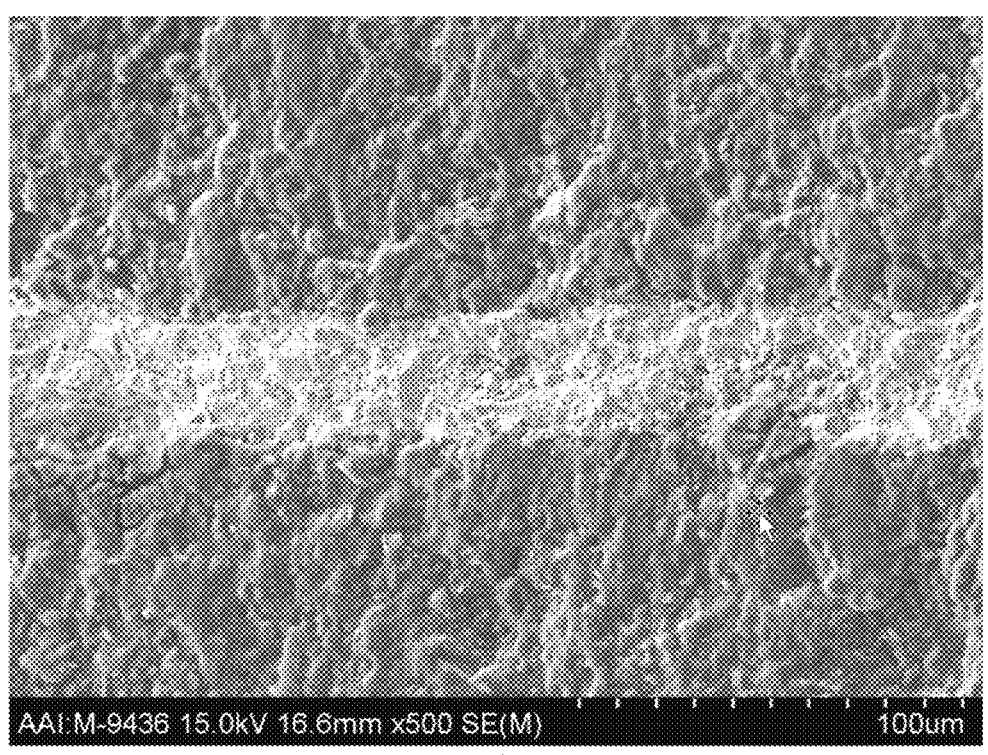
Figure 8C:
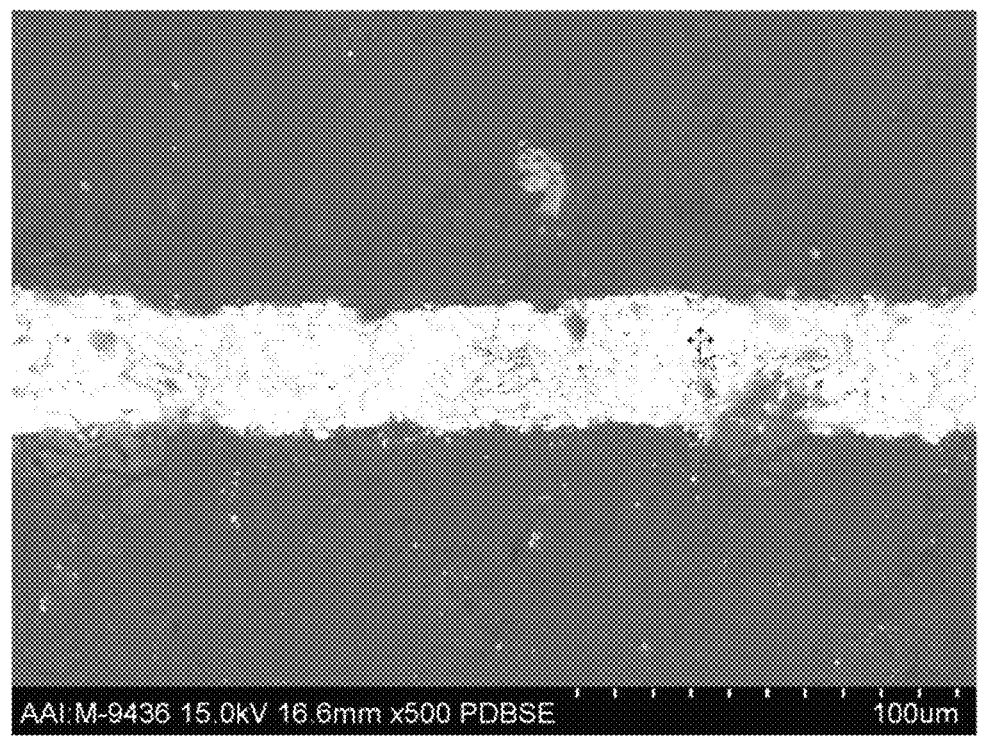
Figure 8D:
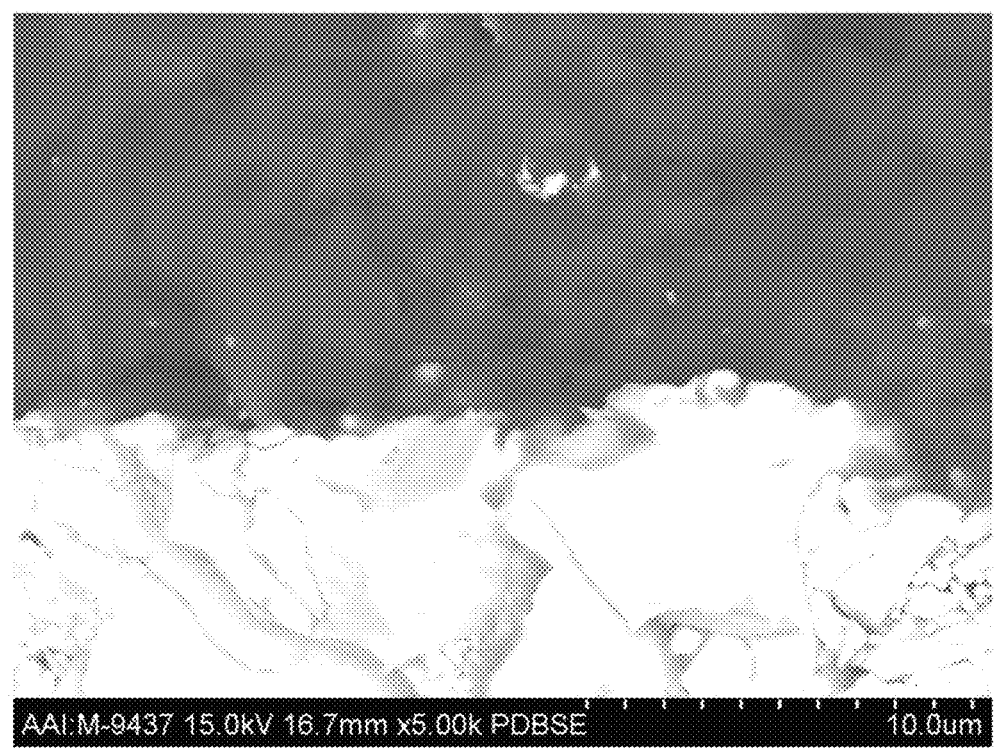

FIG. 7 is a photo of two small graphite blocks joined by a titanium carbide seal. Specifically, titanium foil (having a thickness of 125 micrometers) was positioned and compressed between graphite blocks. This stack was heated to 2400° C. using an induction heater in a low-oxygen environment. The resulting structure is presented in FIG. 7. Once the sample had cooled down, the blocks were torqued using a torque wrench to test the shear strength of the bond. The bond extends homogeneously across the entire gap and has a bonding strength that exceeds that of the graphite it is bonded to. Notably, the fracture strength of TiC is expected to be an order of magnitude or higher than that of graphite.

FIGS. 8A-8D are scanning electron microscope (SEM) images illustrating zirconium carbide seals positioned between two graphite structures. It should be noted that these zirconium carbide seals are substantially free from detectable voids, thereby providing tight liquid seals (e.g., for molten metals) and, in some examples, even hermetic gas seals. These zirconium carbide seals were tested at 100 psi (0.7 MPa) for 1 hour without any detectable gas leakage. Furthermore, no gas leakage was observed when heated to 2400° C. at 100 psi (0.7 MPa).

CONCLUSION

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present embodiments are to be considered illustrative and not restrictive.

The invention claimed is:

1. A method of forming a graphite-based infrastructure for handling a molten metal that can withstand at least one of a high temperature and a high pressure, the method comprising:

positioning a sealing structure between a first graphite component and a second graphite component, wherein:

the first graphite component comprises a first-component initial end directly interfacing the sealing structure, the second graphite component comprises a second-component initial end directly interfacing the sealing structure, the sealing structure comprises one or more metals selected from the group consisting of titanium (Ti), zirconium (Zr), hafnium (Hf), silicon (Si), boron (B), and tungsten (W); and heating the sealing structure, the first-component initial end, and the second-component initial end to at least 600° C., thereby (a) forming a carbide-containing seal by converting the sealing structure, the first-component initial end, and the second-component initial end into the carbide-containing seal and (b) forming a first-component sealed end of the first graphite component and a second-component sealed end of the second graphite component.

2. The method of claim 1, wherein the graphite-based infrastructure, comprising, the carbide-containing seal, is configured to withstand a temperature of greater than 1500° C. (a) while subjected to an internal pressure of greater than 0.7 MPa produced by a molten tin flown through the first graphite component and the second graphite component and (b) while remaining monolithic with each of the first-component sealed end and the second-component sealed end and sealing the first graphite component to the second graphite component.

3. The method of claim 1, wherein the sealing structure, the first-component initial end, and the second-component initial end are heated to at least 2000° C.

4. The method of claim 1, wherein heating the sealing structure, the first-component initial end, and the second-component initial end is performed by flowing the molten metal through the first graphite component and the second graphite component.

5. The method of claim 4, wherein the molten metal comprises tin (Sn).

6. The method of claim 5, wherein the molten metal further comprises the one or more metals selected from the group consisting of titanium (Ti), zirconium (Zr), and hafnium (Hf).

7. The method of claim 4, further comprising forming a secondary seal between the first graphite component and the second graphite component before flowing the molten metal through the first graphite component and the second graphite component.

8. The method of claim 7, wherein the secondary seal is formed by a graphite sheet.

9. The method of claim 7, wherein the secondary seal blocks the sealing structure from contact with the molten metal.

10. The method of claim 1, wherein the sealing structure, the first-component initial end, and the second-component initial end are positioned in a low-oxygen environment when heated to form the carbide-containing seal.

11. The method of claim 10, further comprising forming the low-oxygen environment around the sealing structure, the first-component initial end, and the second-component initial end by:

sealing an enclosure to the first graphite component and the second graphite component, and flowing an inert gas into the enclosure as well as into the first graphite component and the second graphite component.

12. The method of claim 1, wherein the sealing structure, the first-component initial end, and the second-component initial end are heated locally using a localized induction heater positioned proximate to the sealing structure, the first-component initial end, and the second-component initial end.

13. The method of claim 1, wherein the sealing structure is one of (a) a metal wire forming a ring around openings in the first graphite component and the second graphite component or (b) a metal foil having a thickness of 25-125 micrometers.

14. The method of claim 1, wherein the carbide-containing seal is formed by graphite fusing comprising one or more techniques selected from the group consisting of:

brazing the sealing structure with each of the first-component initial end and the second-component initial end, reaction bonding the sealing structure with each of the first-component initial end and the second-component initial end, and diffusion bonding the sealing structure with each of the first-component initial end and the second-component initial end.

15. The method of claim 1, wherein positioning the sealing structure between the first graphite component and the second graphite component is performed using a compression fixture comprising a first clamp, engaging the first graphite component, and a second clamp, engaging the second graphite component.

16. The method of claim 15, wherein each of the first clamp and the second clamp is formed from a refractory material.

17. The method of claim 15, wherein the compression fixture remains as a part of the graphite-based infrastructure.

18. The method of claim 1, wherein positioning the sealing structure between the first graphite component and the second graphite component comprises compressing the sealing structure between the first graphite component and the second graphite component at a pressure of 70-3,500 kPa.

19. The method of claim 1, further comprising:

coating interior surfaces of the first graphite component and the second graphite component with a precursor;

forming an internal carbide-containing sealing coating from the precursor.

20. The method of claim 19, wherein the precursor comprises one or more components selected from the group consisting of a silicon-containing polymer, graphite particles, and metal particles.

* * * * *